(12) United States Patent
Woro

(10) Patent No.: US 7,832,267 B2
(45) Date of Patent: Nov. 16, 2010

(54) METHOD FOR DETERMINING TEMPORAL SOLAR IRRADIANCE VALUES

(75) Inventor: Aaron William Woro, Boulder, CO (US)

(73) Assignee: Ecometriks, LLC, Boulder, CO (US)

( * ) Notice: Subject to any disclaimer, the term of this patent is extended or adjusted under 35 U.S.C. 154(b) by 365 days.

(21) Appl. No.: 12/134,847

(22) Filed: Jun. 6, 2008

(65) Prior Publication Data

US 2009/0125275 A1   May 14, 2009

Related U.S. Application Data

(63) Continuation-in-part of application No. 11/740,087, filed on Apr. 25, 2007, now Pat. No. 7,500,391.

(51) Int. Cl.
*G01W 1/00* (2006.01)

(52) U.S. Cl. ............... 73/170.27; 126/621; 126/623

(58) Field of Classification Search .................. None
See application file for complete search history.

(56) References Cited

U.S. PATENT DOCUMENTS

| | | | |
|---|---|---|---|
| 4,380,996 A | 4/1983 | Mengeringhausen | |
| 4,418,684 A | 12/1983 | Sanders et al. | |
| 5,943,164 A | 8/1999 | Rao | |
| 6,338,027 B1 | 1/2002 | Fulton | |
| 6,748,327 B1 | 6/2004 | Watson | |
| 6,968,295 B1 | 11/2005 | Carr | |
| 7,305,983 B1 | 12/2007 | Meder et al. | |
| 7,500,391 B2 * | 3/2009 | Woro | ............ 73/170.27 |
| 2003/0074244 A1 | 4/2003 | Braxton | |
| 2004/0059691 A1 | 3/2004 | Higgins | |
| 2005/0013477 A1 | 1/2005 | Ratti et al. | |

(Continued)

OTHER PUBLICATIONS

Notice of Allowance issued in related U.S. Appl. No. 11/740,087, filed Apr. 25, 2007, issued Oct. 24, 2008, 9 pages.

(Continued)

*Primary Examiner*—Andre J Allen
(74) *Attorney, Agent, or Firm*—Lathrop & Gage LLP

(57) ABSTRACT

A method for generating temporal solar irradiance values for a selected area. Binary format hillshade files are generated for selected azimuth and altitude points on the Sun's path for selected time points for the area. Data in the hillshade files is reclassified into reclassified files, on basis of the selected time points relative to the solar radiation data. The reclassified files are then summed to generate a set of normalized reclassified files, each representing a selected intermediate interval. The values for each corresponding one of the cells in the set of normalized reclassified files are summed to generate an irradiance-weighted shade file. The hillshade files are summed by inclusively OR-ing corresponding values for each of the cells in each of the hillshade files to generate respective composite files for each said selected intermediate interval. The composite files are then summed to generate a summed shade/time frequency file in which each data point therein represents the frequency of repetition of corresponding cells in the hillshade files over a selected upper interval of time. Each data point value in the irradiance-weighted shade file is then divided by the corresponding data point value in the frequency file to generate a file having solar access values for the upper interval, relative to the intermediate interval, for the selected area.

22 Claims, 26 Drawing Sheets

U.S. PATENT DOCUMENTS

| | | | |
|---|---|---|---|
| 2005/0017967 | A1 | 1/2005 | Ratti et al. |
| 2005/0039787 | A1 | 2/2005 | Bing |
| 2007/0124335 | A1 | 5/2007 | Park et al. |
| 2008/0105045 | A1* | 5/2008 | Woro ............... 73/170.27 |
| 2008/0147335 | A1* | 6/2008 | Adest et al. ............ 702/64 |
| 2009/0125275 | A1* | 5/2009 | Woro ................ 702/182 |

OTHER PUBLICATIONS

International Search Report and Written Opinion dated Jun. 12, 2009 issued in related PCT Patent Application Serial No. PCT/US09/32001, 11 pages.

Broesamle, H., Mannstein, H.; Schillings, C.; Trieb, F.; Assessment of Solar Electricity Potentials In North Africa Based On Satellite Data And A Geographic Information System; Solar Energy vol. 70, No. 1, pp. 1-12, Feb. 10, 2000, published 2001.

Rylatt, M.; Gadsden, S.; Lomas, K.; GIS-Based Decision Support for Solar Energy Planning in Urban Environments; Computers, Environment, and Urban System; pp. 579-603; 2001.

Gadsden, Stuart; Rylatt, Mark; Lomas, Kevin; and Robinson, Darren; Predicting The Urban Solar Fraction: a methodology for Energy Advisers and Planners Based on GIS; Energy and Buildings, 37-48; 2003.

* cited by examiner

US 7,832,267 B2

METHOD FOR DETERMINING TEMPORAL SOLAR IRRADIANCE VALUES

RELATED APPLICATIONS

The present application is a continuation-in-part of U.S. patent application Ser. No. 11/740,087, filed Apr. 25, 2007, now U.S. Pat No. 7,500,391 titled "System and Method for Identifying the Solar Potential of Rooftops".

BACKGROUND

The evaluation method for profiling a house's potential for solar power is presently manual labor-intensive. A typical house evaluation includes the required instruments and a climb atop the roof to profile the solar power potential by estimated k/W hours and expected return on investment following the assessment of roof geometry and the effect on shading from obstructions. If the house has the necessary geometric specifications and reasonable annual solar exposure, then a certain solar power system size is recommended. However, the process is time-consuming and relatively expensive.

A typical homeowner who is considering solar power must first find a listing of solar providers, and then arrange a time and date for each one of them to evaluate the house for potential. This often occurs as many as five separate times, as opinions and measurements differ between evaluations. The aggregate effect on the solar industry is considerable. From the initial inquiry through to installation, the resources spent on evaluations can run into the hundreds of dollars. This cost is ultimately passed on to consumers, for whom this is often the chief obstacle when considering solar power. In other cases, those who own houses that are perfectly situated to exploit the benefits of distributed solar power are often unaware of the investment potential. Currently, targeted demographic marketing is the primary tool used in the expansion of solar power.

The present system and method solves a key problem in residential solar power distribution by removing the need for physical site visits to survey and qualify houses for potential solar power utilization. Using various types of satellite and remote-sensing technology in addition to datasets already made available by the United States Census Bureau, commercial demographic services, and municipal parcel databases, the present system employs GIS or IGS (Interactive Geometric Software) software to analyze numerous variables, in three dimensions, related to a given dwelling, including the surface area of its roof; the slope and direction of the roof's various portions; related address and owner information for each dwelling; also, items specific to the microclimate and precise geographic location of the structure are taken into account by the process including potential shading from trees and other local structures and obstructions. The information required as input data for the GIS system is obtained using aerial remote sensing technology.

SUMMARY

A method is disclosed for generating temporal solar irradiance values. Initially, binary format hillshade files are generated for selected azimuth and altitude points on the Sun's path for selected time points for a selected area. Data in the hillshade files is reclassified into reclassified files, on basis of the selected time points relative to the solar radiation data. The reclassified files are then summed to generate a set of normalized reclassified files, each representing a selected intermediate interval. The values for each corresponding one of the cells in the set of normalized reclassified files are summed to generate an irradiance-weighted shade file. The hillshade files are summed by inclusively OR-ing corresponding values for each of the cells in each of the hillshade files to generate respective composite files for each said selected intermediate interval. The composite files are then summed to generate a summed shade/time frequency file in which each data point therein represents the frequency of repetition of corresponding cells in the hillshade files over a selected upper interval of time. Each data point value in the irradiance-weighted shade file is then divided by the corresponding data point value in the frequency file to generate a file having solar access values for the upper interval, relative to the intermediate interval, for the selected area.

DETAILED DESCRIPTION

Figure 1:
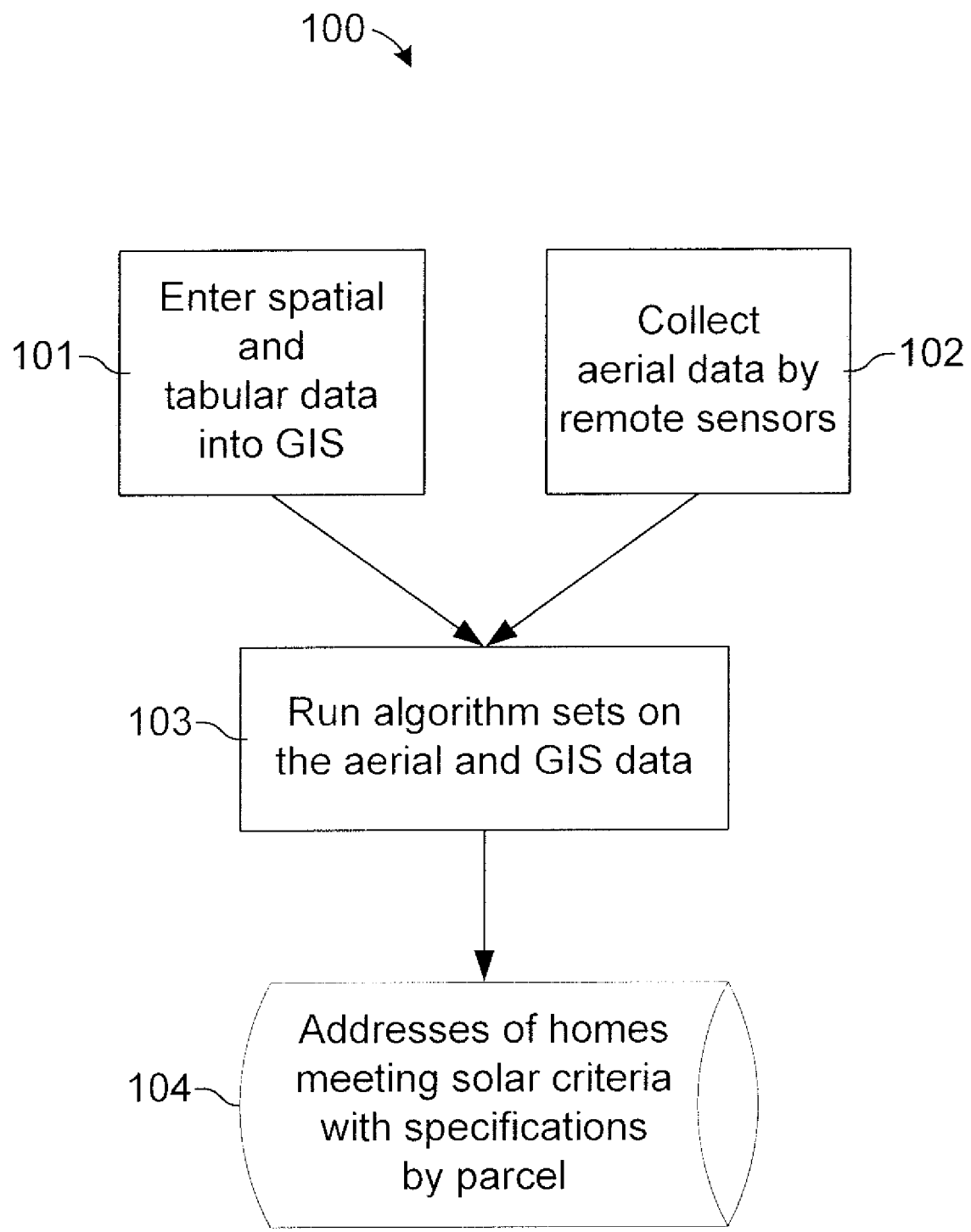
FIG. 1 is a flowchart showing a high-level exemplary embodiment of the present system.

FIG. 1 is a flowchart showing a high-level exemplary embodiment of the present system and method. The present GIS-based technology and associated algorithms deliver an output of specific addresses in both cartographic and tabular form that reveal the houses (or other buildings) found to match the defined parameters set by the user. The information delivered also contains the specific data for solar potential for every dwelling within the coverage.

As shown in FIG. 1, at step 101, public and commercial spatial and tabular data are entered into a geographic information system ('GIS'). The present system analyzes the solar potential of houses and other buildings based on variable parameters including some or all of the following specifications and other data:
Roof space
Roof direction
Roof slope
Address and demographic profiles
Lack of tree cover (annual shadow patterns over rooftops)

Listed below are examples of public/commercial datasets that may be used as system inputs in the solar potential evaluation process:
Parcel frameworks (i.e., property boundaries)
Digital Elevation Models (used for forestry, flood plain mapping, etc.)
High-resolution (<30 cm) aerial photography
Climate inclusive solar irradiance levels At step 102, aerial data is collected. This data may be efficiently collected by an airplane, but may, alternatively, be collected by other types of aircraft (e.g., balloons) or Earth-orbiting vehicles (spacecraft). In an exemplary embodiment, aerial data includes LiDar (Laser Detection and Ranging), LiDar infrared imaging, and aerial photography of parcels of land on which houses and other buildings are located. A digital elevation model (DEM) and/or a digital terrain model (DTM) are extracted from the LiDar and aerial photographs, which are often acquired concurrently during the same flight missions.

An established/standardized GIS-based algorithm set is run to receive data and to allow for geoprocessing, and delivers addresses and precise profiles of houses in a given county (or other areas) that demonstrate various levels of potential for distributed solar power in their entirety, or as specified by the user and/or commercial/government entity making the inquiry. At step 103, algorithm sets (described in detail below) are then run on the aerial and GIS data to generate data 135 in cartographic and tabular form of the solar potential of houses, with specifications by 'parcel' address, i.e., specifications for a particular plot of land on which a dwelling is located.

The GIS algorithms receive and process the necessary data, which is consistently similar in data requirements that are entered into a geodatabase. The data is then processed (georeferenced, georectified, tables constructed, layering performed, etc.) and processed by the present system.

Figure 2A:
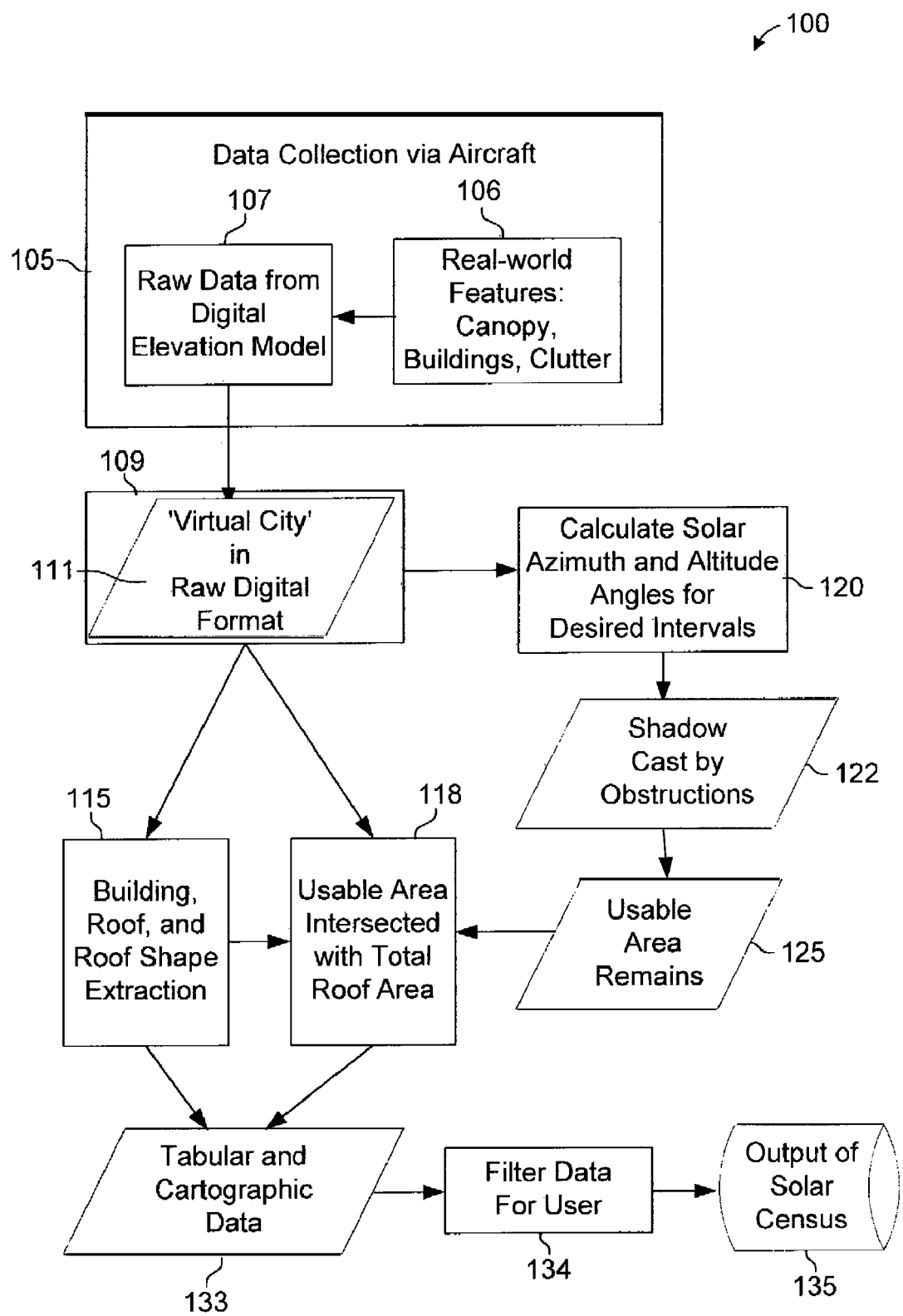
FIG. 2A is a flowchart showing a mid-level exemplary embodiment of the present system.

FIG. 2A is a flowchart showing a mid-level exemplary embodiment of the present system. The data collection method for the present geospatial analysis employs remote sensing technology to extract real-world features in three dimensions, which are stored as X, Y, and Z positions of a spatial coverage (or using an equivalent spatial storage method). As shown in FIG. 2, in block 105, aerial data is collected via aircraft (and/or spacecraft). More specifically, in an exemplary embodiment, the information required as input data for the present GIS system is obtained using airborne remote sensing technology, such as LiDar (Light Detection and Ranging), IFSAR/INSAR (Interferometric Synthetic Aperture Radar), infrared spectrometry, aerial photogrammetry, etc. This input data includes real-world features 106 such as vegetation canopy, buildings, and clutter.

Raw data 107 from digital elevation/terrain models (DEM/DTM) 142, in conjunction with data from real-world features 106, is then used to generate a 'virtual city' 111, at step 109 A virtual city is a digital depiction of real world geography and features, comprising a three-dimensional dataset extracted from one or more digital elevation models via photogrammetry. The digital elevation/terrain models are extracted using LiDar/IFSAR, and may also be generated from other passive/active forms of high resolution remote sensing. Aerial/photogrammetric DEM extraction may be used to generate the digital elevation/terrain models if the technology employed is sufficiently accurate.

Figure 2B:
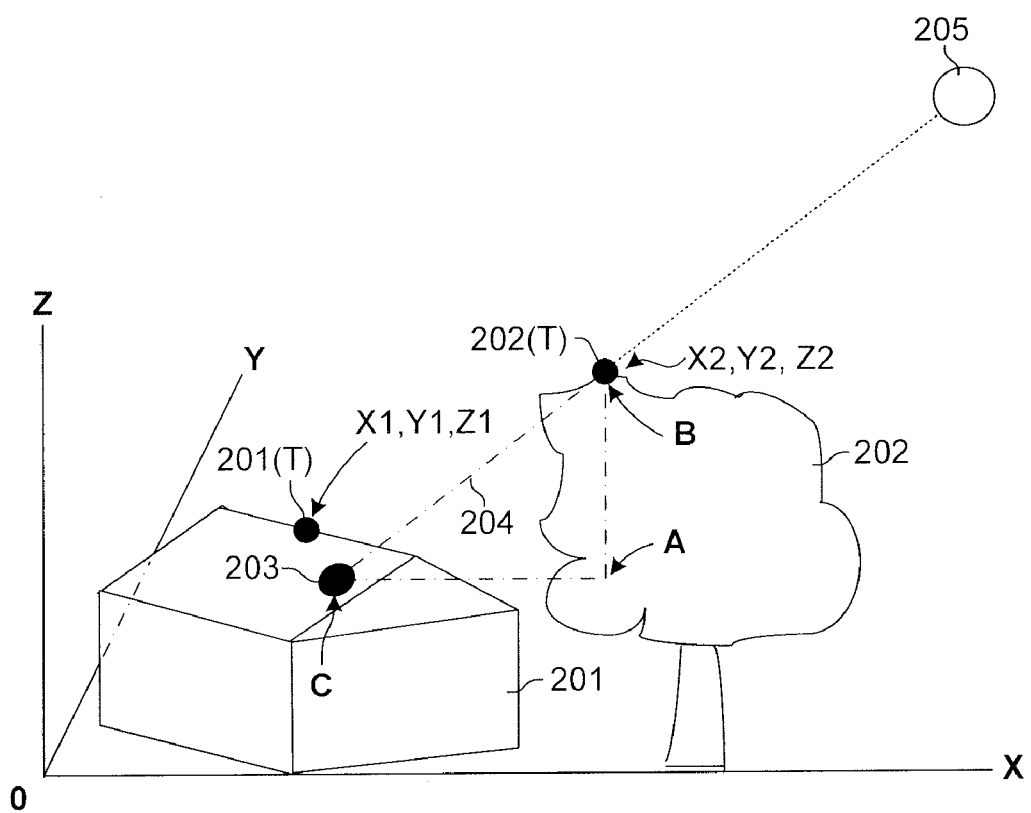
FIG. 2B is a diagram showing a digital elevation/terrain model in terms of XYZ coordinates.

FIG. 2B is a diagram of two elements of virtual city 111 showing example XYZ coordinates (which are employed in all digital elevation/terrain models), using a single building 201 and tree 202 as an example of data included in virtual city 111, comprising DEM/DTM data 142 that has been integrated with data from real-world features 106. As shown in FIG. 2B, the top center 201(T) of building 201 is represented by coordinates X1, Y1, Z1, and the highest point 202(T) of tree 202 is represented by coordinates X2, Y2, Z2.

The furthest point C of shadow 203 from high point 202(T) of tree 202 is used in determining annual shading effects. For any given date/time, point C can be determined with reference to the triangle ABC, where the angle ACB of the triangle (relative to the horizontal) is determined by the line passing between the sun 205, point 202(T), and the rooftop of building 201. In the example of FIG. 2B, given angle ACB, the length 204 of hypotenuse BC of triangle ABC can readily be determined from the height of the roof, the height of point 202(T), and the horizontal distance AC between point 202(T) and point C. The potential tree shadow arc with respect to the rooftop of building 201 can be built on multiple separate calculations (one for each desired interval), as described below in detail with respect to FIGS. 8 and 9.

As shown in FIG. 2A, virtual city DEM/DTM data 111 is processed by GIS system 110 (shown in FIG. 3, described below) to generate tabular and cartographic data 133. More specifically, in step 115, building, roof, and rooftop shape extraction is performed. This process is described in detail below with respect to FIGS. 6, 7, and 8.

In step 120, solar azimuth and altitude angles are calculated for desired intervals (e.g., every hour over an annual/monthly/weekly time period) to determine the shadow 122 cast by obstructions including vegetation, buildings and other structures. The usable remains 125 of the rooftop sections are then generated, and then the XY shadow simulation data is intersected with the XY coordinates of the rooftop areas, in step 118, to yield overlaid files, having spatial attributes, showing rooftop areas that are shade-free (or which have shadow cover less than a pre-specified percentage of time) over the course of a year or other specific period of time. All points/pixels that exist outside these coordinate boundaries are deleted. This process is described in detail below with respect to FIG. 9.

Next, the outputs of process steps 115 and 118 are formatted in both tabular and cartographic form, at step 133. The tabular and cartographic data is then filtered as requested by a system user in step 134 to provide solar census output 135.

Figure 3:
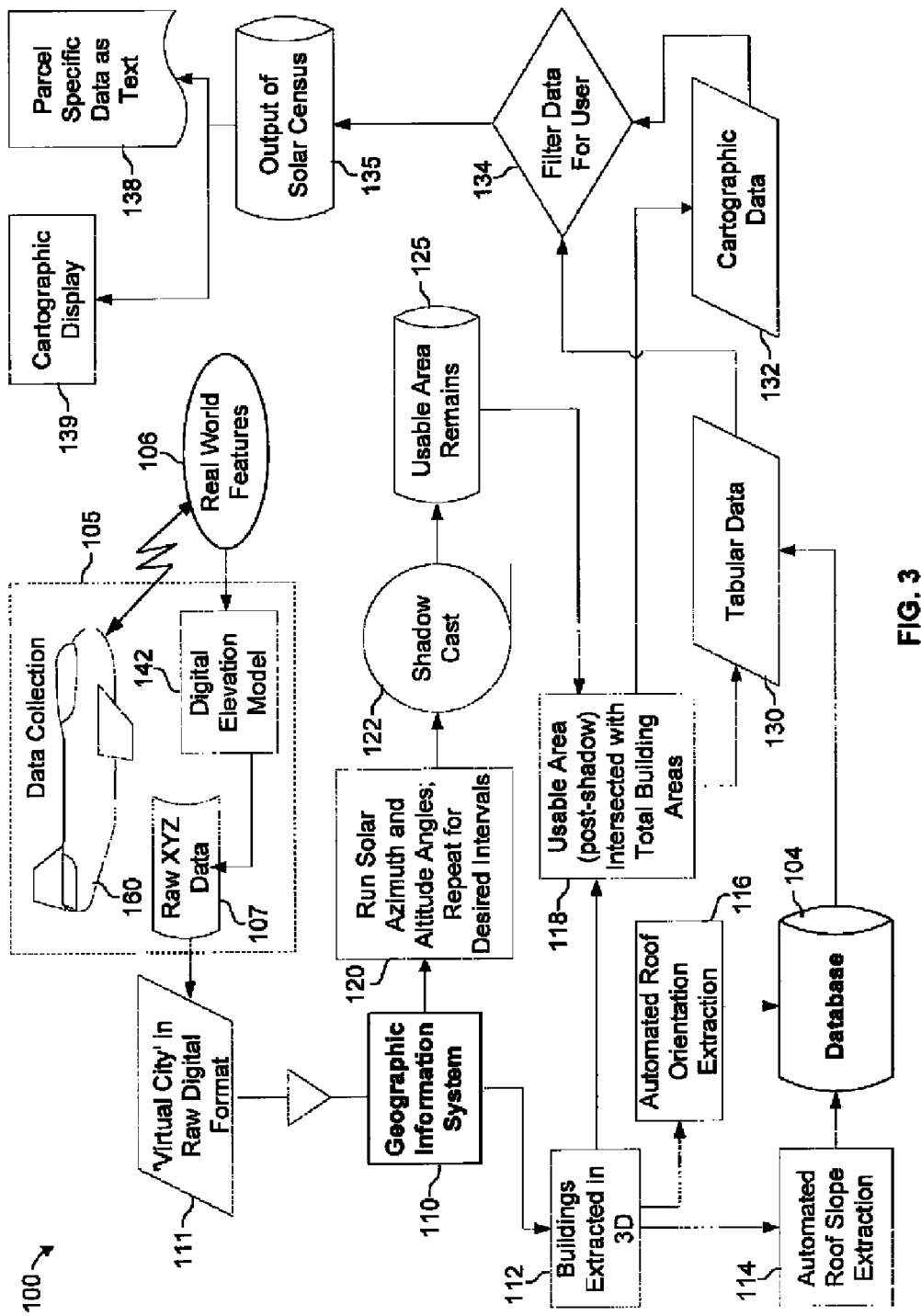
FIG. 3 is a flowchart showing an exemplary embodiment of the present system in greater detail.

FIG. 3 is a flowchart showing an exemplary embodiment of the present system in greater detail. As shown in FIG. 3, data collection is performed by aircraft 160 (and/or spacecraft) at step 105, as described above with respect to FIG. 2A. Raw data 107 from digital elevation/terrain models (DEM/DTM) 142, in conjunction with real-world features 106, is then used to generate 'virtual city' 111, the data for which is transmitted from the aircraft 160 to GIS 110.

Figure 4:
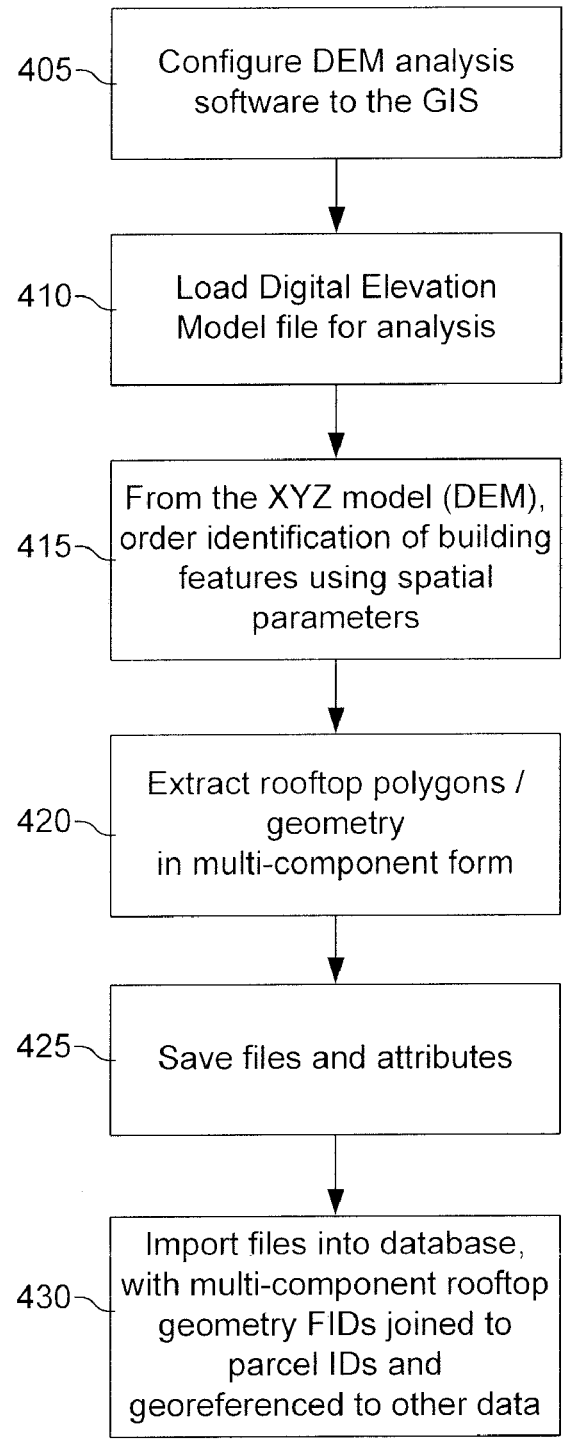
FIG. 4 is a flowchart showing exemplary details of process 112 for extracting buildings and rooftops as three-dimensional vector or raster files.

Extracting buildings/rooftops as three-dimensional vector files is the first preferred step of geographic/geometric deduction, wherein rooftops are identified by their location and the rest of the features and corresponding XY coordinates are filtered out of the geospatial data. FIG. 4 is a flowchart showing exemplary details of process 112 (in FIG. 3) for extracting buildings and rooftops as three-dimensional vector files. Operation of the present system is best understood by viewing FIGS. 3 and 4 in conjunction with one another. As shown in FIG. 4, at step 405, DEM analysis software is configured to the GIS 100. Examples of DEM analysis software are LiDar Analyst™ by Visual Learning Systems, and SilverEye™ by GeoTango International Corp. This software enables the extraction of building/spatial features using automated/semi-automated processes.

In step 410, the Digital Elevation Model file is loaded into GIS system 110 for analysis. Z (height) data values must be available to provide attribute differentials during extraction. In step 415, the identification of building features is ordered from the XYZ model (DEM/DTM) using the necessary spatial parameters. Spatial parameters are necessary to enable geometric processing. In the case of residential rooftops, these spatial parameters may include, for example: 1) size of building surface->10 $m^2$<40 $m^2$; 2) slope parameters->5°-<40°; 3) texture variance, which assists in differentiating between trees, clutter, buildings etc.; and 4) distance above recognized surface (e.g., distance above ground)->3 m-<15 m. When analyzing the solar potential of commercial rooftops, these parameters may vary (e.g., slope is often 0°, area is >100 $m^2$, etc.).

In step 420, rooftop polygons are extracted as multi-component sections, in order to allow for further processing. In step 425, the polygons (which, in Geographic Information Systems, are files in vector format typically referred to as 'shapefiles') are saved with attributes, which may include calculated areas for multiple roof components, roof type (e.g., gabled, complex etc.), general polygon slope, and which must include X, Y, and Z values. Typical attributes may include roof type, slope, area, etc. In step 430, these shapefiles are imported into geodatabase 104, with multi-component rooftop FIDs (feature IDs) joined to parcel IDs and georeferenced to all other data.

Figure 5:
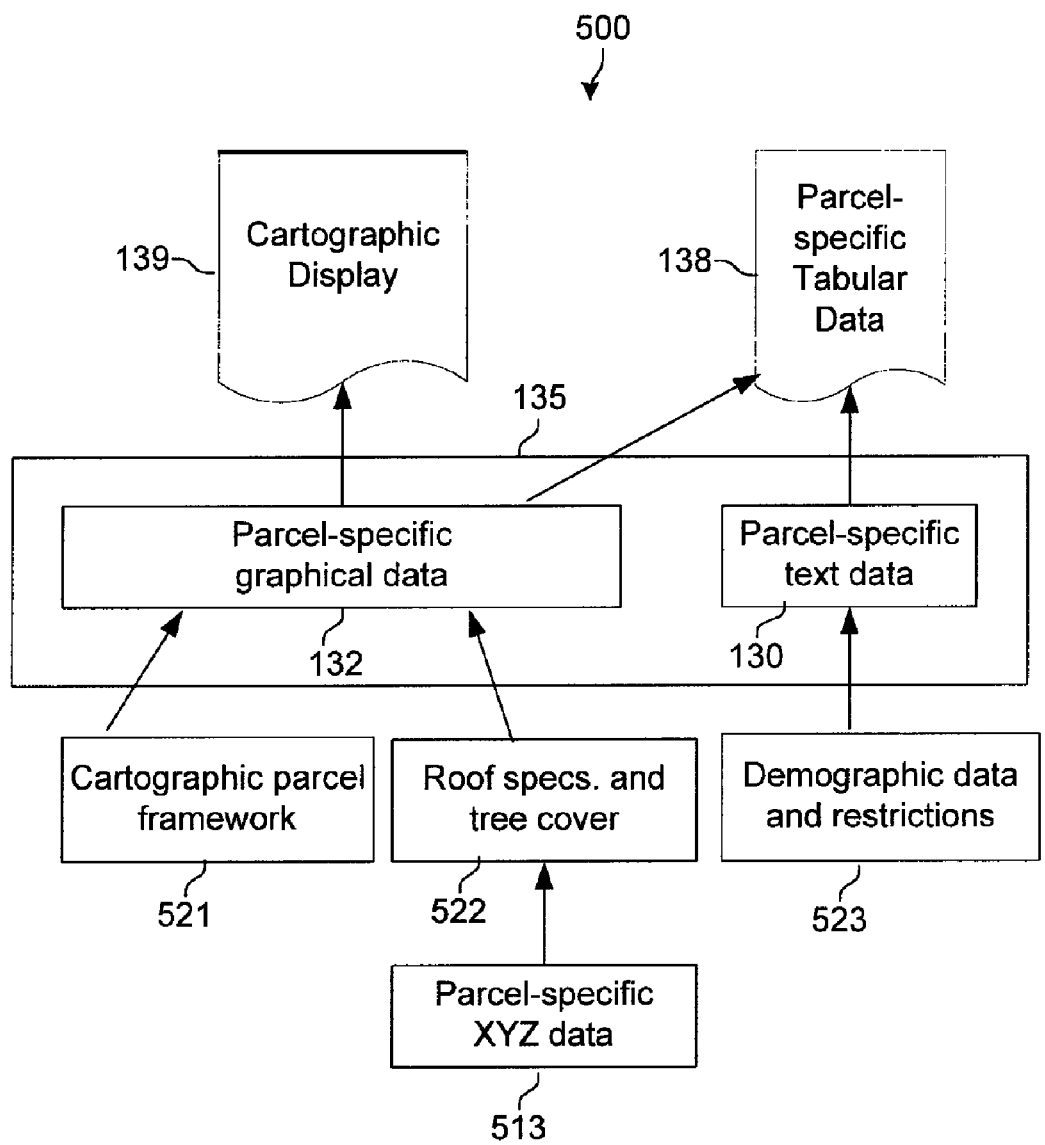
FIG. 5 is a flowchart showing exemplary datasets that serve as inputs to the present system.

Each of the shapefiles contains attributes, but none are bound to the output without further processing, which is necessary to produce data in geospatial/cartographic format for use in the processes that follow. Shown in FIG. 5 is the concept 500 of datasets that serve as inputs to the present system 100. In an exemplary embodiment, these datasets may include parcel-specific LiDar or other DEM (XYZ) data 513, parcel building frame data, parcel-specific census data, and parcel-specific electrical usage.

The control arrow between blocks 513 and 522 signifies the processing that enables these datasets to serve as bound cartographic frameworks, offers precise readings of roof specifications and shade, and allow for restrictions to be placed on the large demographic datasets that will reveal only the parcels that adhere to the geodemographic parameters set and/or input by a system user. Parcel building frame data 511 and other spatial requirements 512 are processed to generate cartographic frameworks 521, and, in one embodiment, parcel-specific LiDar data 513 is used to generate geometric display data 522 of roof specifications and tree cover. Parcel-specific census data and parcel-specific electrical usage are used to generate demographic restrictions 523, such as parcel value, home ownership, household income etc.

The processed data described above is registered in the geodatabase 104 as specific addresses that have satisfied criteria used by processing algorithms to reveal the parcels (home sites) that meet a threshold solar potential. Cartographic framework 521 and display data 522 are combined to generate parcel-specific cartographic data 132 (FIGS. 3 and 5), and demographic data and restrictions 523 are used to generate parcel-specific text data 130. Graphical data 132 and text data 130 comprise the output-ready solar census 135, stored in database 104.

In an exemplary embodiment, when database 104 is queried/filtered to generate the final output, the database output takes the form of:

(1) A map 139 indicating the precise locations of the parcels that have met or exceeded the solar-potential criteria used in the process; and (2) A table 138 containing variable parameters (specifications) indicated above with respect to FIG. 1, and additionally including addresses for each parcel.

Figure 6:
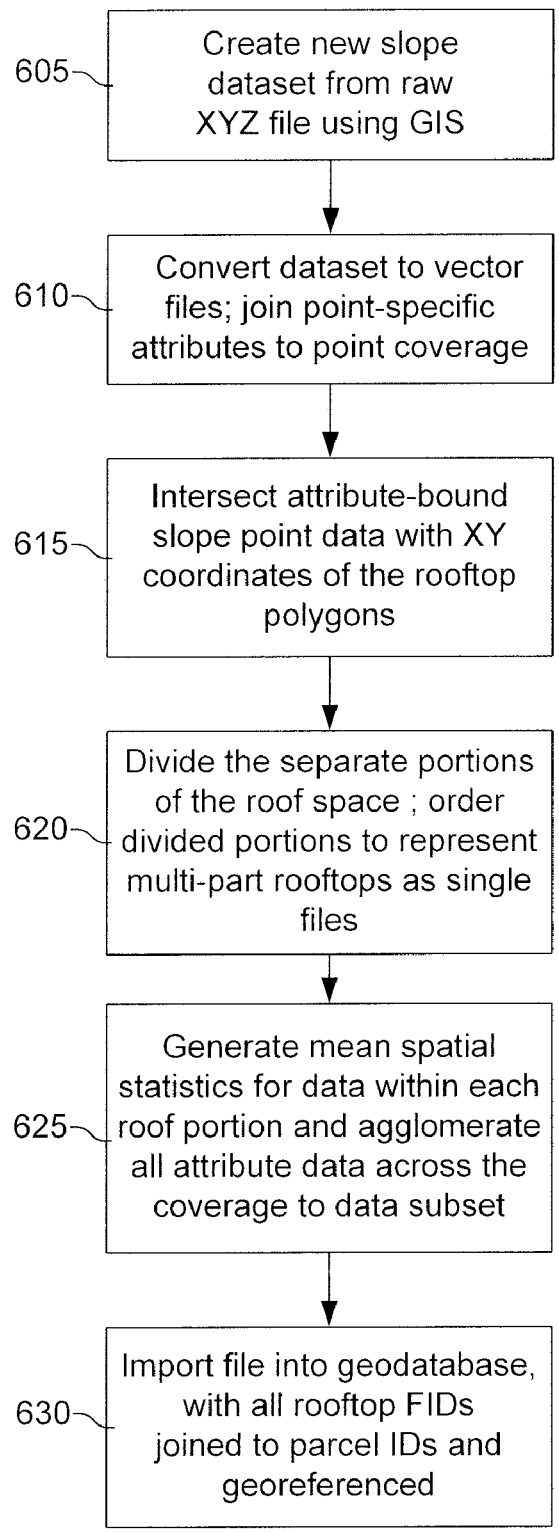
FIG. 6 is a flowchart showing exemplary details of process 114 for roof portion-specific slope extraction.

FIG. 6 is a flowchart showing exemplary details of process 114 (in FIG. 3) for roof portion-specific slope extraction. As shown in FIG. 6, in step 605, a new slope dataset is created from raw XYZ file data using the GIS 110. This conversion is applied to the entire dataset. The new slope layer is then converted to integer format. In step 610, the dataset is converted to points, and point-specific attributes are bound to point coverage. There is now one datum for every point within the coverage.

In step 615, the extracted rooftop polygons are added to the GIS workspace, and the attribute-bound slope point data is intersected with the XY coordinates of the rooftop polygons. All points that fall outside the polygons are deleted. There is now a single dataset that represents one slope datum (e.g., 18°) per point at the given resolution within the rooftop area only.

In step 620, statistical divisions and anomalies that divide the separate portions of the roof space are calculated, and the divided portions are ordered to represent the multi-part rooftops and bind attribute sub-data to their respective portions on the XY plane.

In step 625, the mean spatial statistics of all data within each roof portion are generated and all attribute data is agglomerated across the coverage to this point-in-polygon subset to create an agglomerated attribute file.

This attribute file is then imported into the geodatabase 104 at step 630, with all rooftop FIDs joined to parcel IDs and georeferenced. An output example is the following tabular data indicating parcel address, roof-section polygon feature identification number, roof-section slope (determined by extracted Z statistics), and roof section dimensions:

29 Palms Ave, Miami Fla. 33107
FID1—16° (X meters/Y meters)
FID2—16° (X meters/Y meters)
FID3—22° (X meters/Y meters)
FID4—22° (X meters/Y meters)

Figure 7:
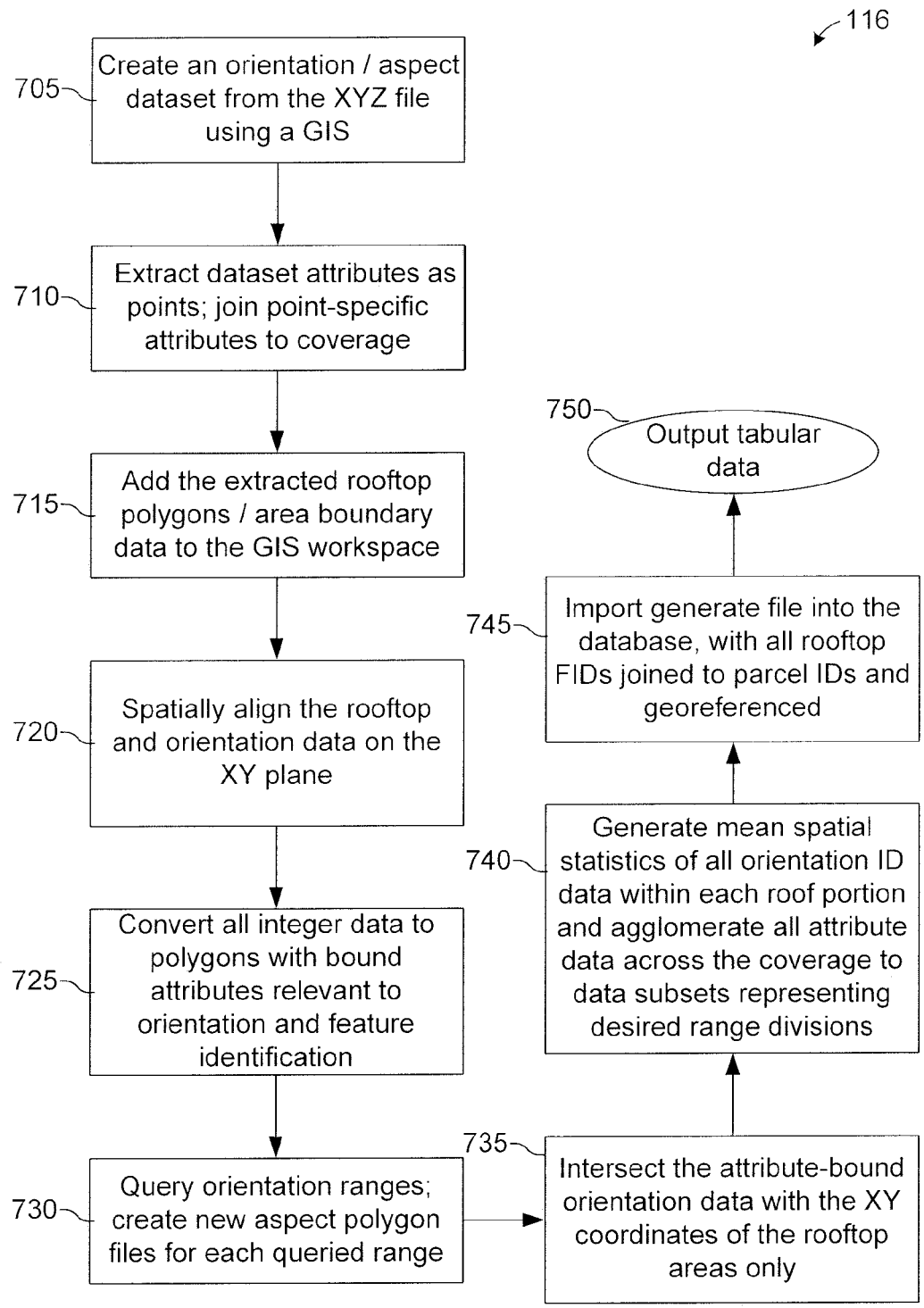
FIG. 7 is a diagram showing an example of process 116 for determining roof orientation.

FIG. 7 is a diagram showing an example of process 116 for determining roof orientation. As shown in FIG. 7, in step 705, an orientation/aspect dataset is created from the XYZ data file using GIS 110. This conversion is to be applied to the entire dataset; new orientation data is then converted to text and integer formats. In step 710, all integer data is converted to points, and point-specific attributes are bound to point coverage. There is now one datum for orientation for every point within the coverage.

In step 715, the extracted rooftop polygons/area boundary data are added to the GIS workspace, and in step 720, rooftop data files and orientation point data are georeferenced so that the data is aligned on the XY plane. In step 725, all integer data is converted to polygons with bound attributes relevant to orientation and feature identification.

In step 730, orientation ranges (e.g.: I, II, and III (120-170, 171-220, and 221-280) are queried to create new aspect polygon files for each queried range. The purpose of this operation is to divide the orientation of the roof areas into individual files for a DBMS (database management system) such as SQL. The present step identifies the orientation of a single roof portion, as almost all rooftops in their entirety are orientated to 360° of the horizontal plane. Extracting the individual attributes can be done as single integers without queries as well. In step 735, the attribute-bound orientation point/polygon data is intersected with the XY coordinates of the rooftop areas only. All points that fall outside these coordinate boundaries are deleted. There are now datasets in any division, determined by the user's DBMS query preferences, that represents one datum (e.g., 180°/south) per point inside the individual rooftop portions. In step 740, the mean XY statistics of all orientation ID data within each roof portion are generated, and all attribute data is agglomerated across the coverage to point-in-polygon subsets representing range divisions as preferred. The resulting data is stored in an agglomerated attribute file.

In step 745, this attribute file is imported into the geodatabase 104, with all rooftop FIDs joined to parcel IDs and georeferenced. An output example of tabular data generated from this attribute file (at step 750) is shown below:

29 Palms Ave, Miami Fla. 33107
FID1—72° ENE
FID2—162° SSE
FID3—252° WSW
FID4—342° NNW The GIS database 104 is controlled by queries, the desired purpose of which is to locate portions of rooftops with optimum orientation for solar power. However, the present method ultimately allows for all rooftops to be split and identified by orientation regardless of user preference.

Figure 8:
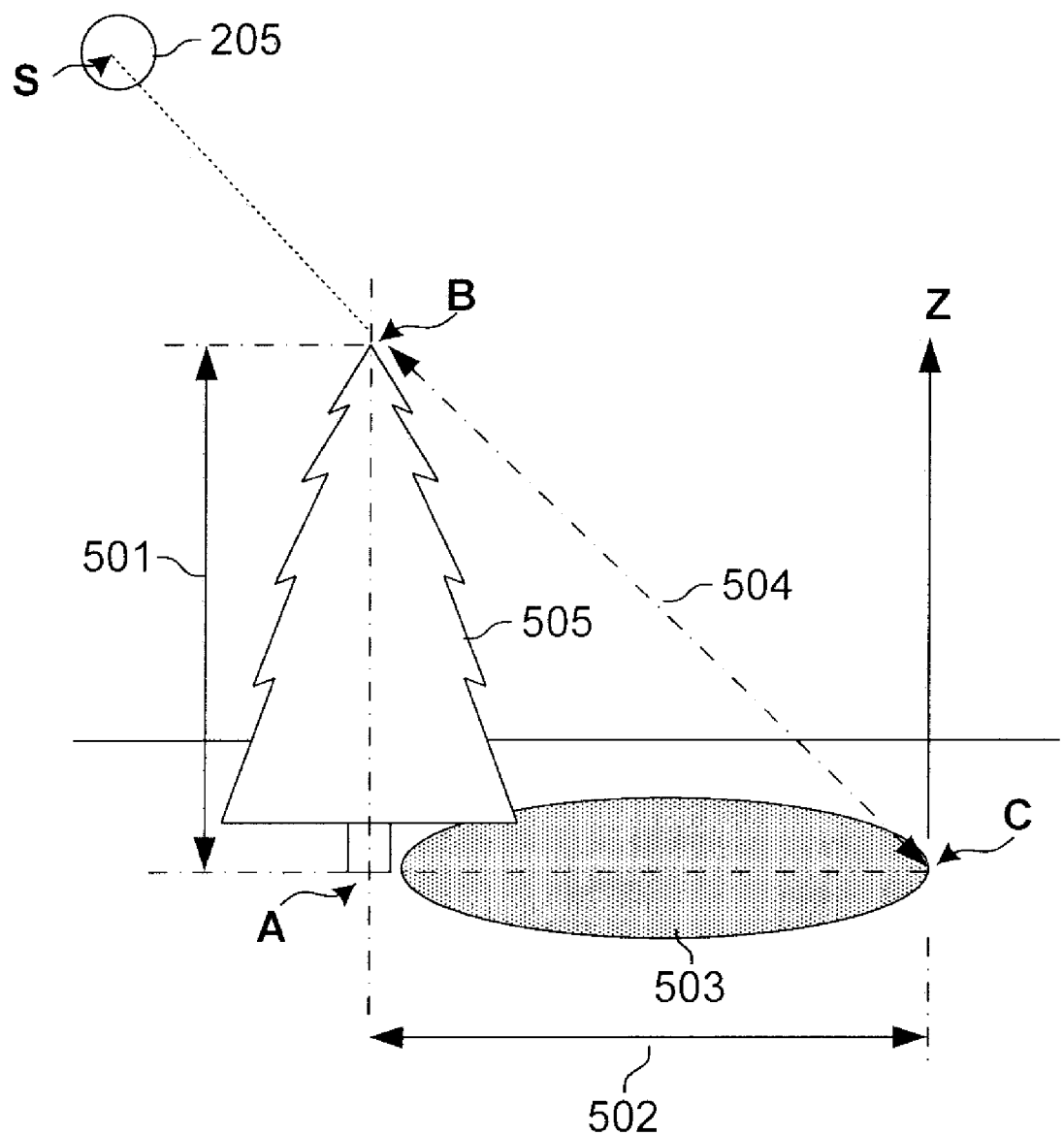
FIG. 8 is a flowchart showing an exemplary method for determining annual tree shade patterns.

FIG. 8 is a diagram showing an exemplary method for determining annual tree shade patterns. To accurately simulate annual shade patterns cast by trees and surrounding obstructions, a tree cover algorithm creates a series of overlapping vector files around trees identified by, for example, LiDar canopy files.

A 'zenith angle' is the angle between the local zenith and a line of sight to an object (i.e., the Sun 205). If point C=the ground site, point Z=any point directly above point C (e.g., the zenith), and point S=the Sun, then the Sun's viewing zenith angle=the angle ZAS. The zenith angle z is thus defined to be the angle subtended by the sun at the center of the earth and normal (perpendicular) to the surface of the earth. The zenith angle in the example of FIG. 8 is the angle subtended by the Sun (point S), point C, and the zenith Z, or angle SCZ, which is equal to angle (90°−ACB), the complement of the angle between the horizon and the sun as viewed from the edge of shadow 503 furthest from tree 505.

Simulated monthly (or other interval) shadow extent is then extracted based on the latitude/longitude (XY) location of individual building and tree height (determined by Z value in the data). Simple Pythagorean geometry with automated shadow identification using grey-scale range is employed in the tree cover algorithm as follows:

1) GIS 100 locates point A (bottom of tree/established surface at relative elevation 0.0, the 'bare Earth' surface) at a point on the vegetation.
2) Point B (top of tree) is located via LiDar data, using the Z value for that point.
3) Tree height is distance 501 between A and B.
4) Point C is located by the GIS by determining the precise XY location on the surface based on the position of the sun relative to the tree/obstruction casting the shadow (line SBC). This line is a result of a simulated projection relative to the obstruction height B and XY surface location A.
5) The hypotenuse 504 of triangle ABC and the height of the tree 501 are extracted from these calculations, using the Pythagorean theorem, to yield the distance 502 the triangle can cover. A set of potential tree shadow arcs 503 can then be built on separate calculations (one for each month, or any other desired interval) using a geometric algorithm and solar zenith/altitude and azimuth data within the DEM, as described in FIG. 9. An alternative process that extracts the same data with the same geometry deploys 'line of sight' geometry to determine the line SBC referred to above, without employing trigonometry.
6) The filled-in arc 503 of annual shadow extent is then generated, using the method employed in FIG. 9.

Figure 9:
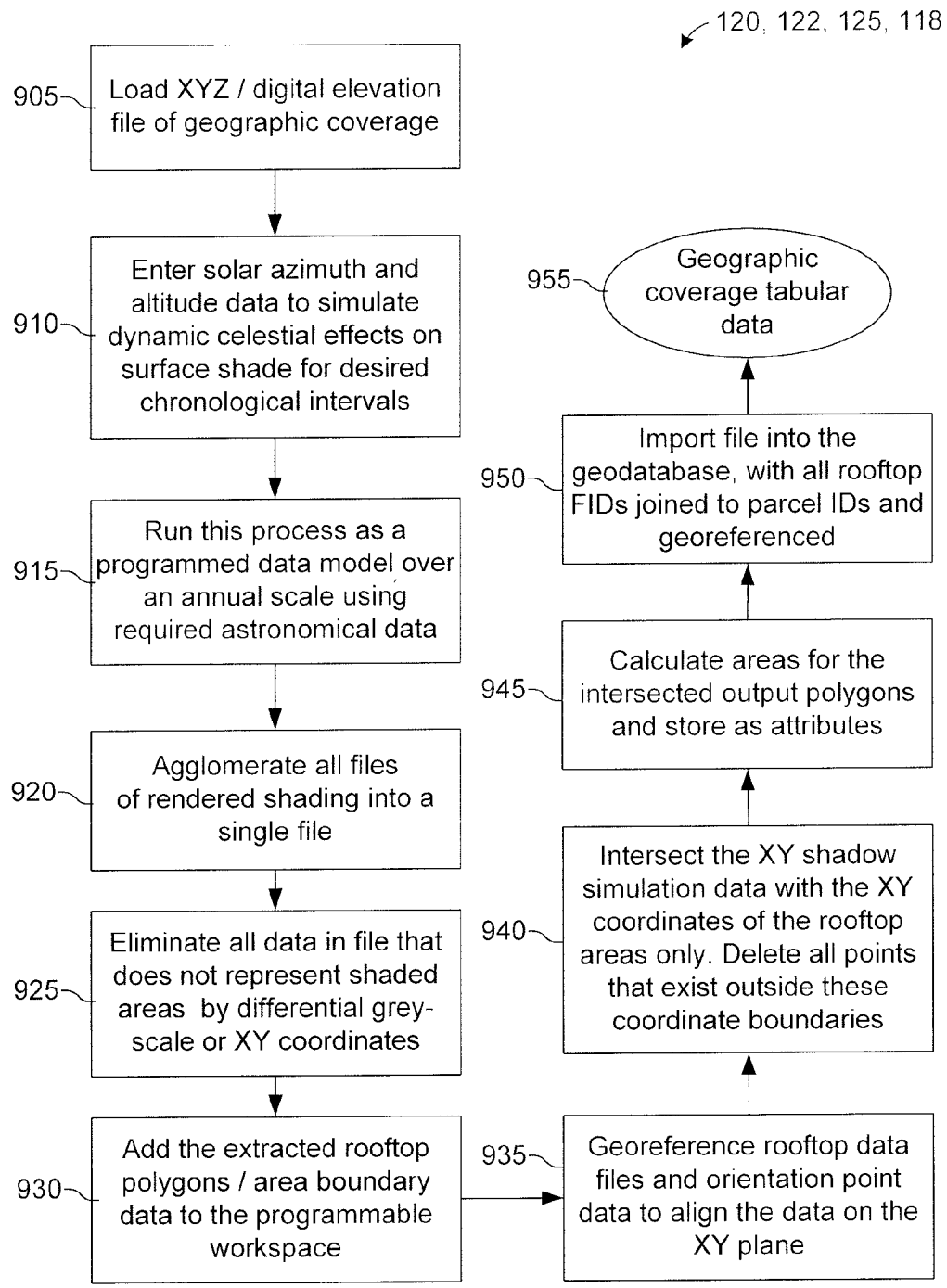
FIG. 9 is a flowchart showing exemplary details of the process for converting annual shadow extraction to usable roof area.

FIG. 9 is a flowchart showing exemplary details of the process for extracting annual shadow extraction and converting the data to usable roof area. This flowchart details steps 120, 122, 125, and 118 in FIG. 3, and employs the geometry shown in FIG. 8. More specifically, this conversion process is performed as follows.

In step 905, XYZ/digital elevation file of geographic coverage of the area for which data has been acquired (or other selected area of interest) is loaded into GIS 110. In step 910, solar azimuth and altitude data are entered into GIS 110 to simulate dynamic celestial effects on surface shade for desired chronological intervals. For example, a single entry may have a solar altitude of 59.2 and solar azimuth of 99.2 to simulate the shading effects over a three dimensional surface at 10:19 am on Aug. 3, 2006 at 80° W and 25° N.

To extract shadows cast by obstructions, the GIS/IGS applies the Pythagorean theorem. If (x0, y0) and (x1, y1) represent points in the plane, then the shadow cast will be determined by the altitude and azimuth angles of the sun relative to those coordinates. The height (Z) of the points creating the obstruction (e.g., tree top or tree branch, chimney, etc.) from the surface is $(a1-b1)^2$+the distance from that coordinate on the (XY) plane, determined by the astronomical position of the sun $(a2-b2)^2$. The hypotenuse of triangle ABC can then be generated as a straight line that simulates the shadow cast, in accordance with the equation $AC^2+BC^2=AB^2$.

This shadow-extraction process is repeated at desired intervals over an annual time period using the necessary astronomical data to generate multiple arcs coverages that represent annual shadow extent. The process is then run as a programmed data model, at step 915, to generate a set of rendered shading files. The model repeats this process at desired intervals (e.g., 6 minutes) over an annual time period using the necessary astronomical data.

In step 920, all of the files of rendered shading are agglomerated (or 'dissolved') into a single file; that is, a mosaic of the files is created. This rendered shading file contains pixels that represent the division between shaded and non-shaded areas, and can be stored in either XY (two-dimensional) or XYZ (three-dimensional) formats. This single file represents the complete shading effects from all objects on all objects within the geographic coverage for one year.

In step 925, all data in this file that does not represent shaded areas is eliminated. For example, if the user has chosen to cast shade over a tri-band color photograph of the coverage, the shaded areas may be represented by grey-scale/black pixels. In this case, all pixels that represent color integers (1-256) outside this grey-scale are eliminated. This new file represents only the XY coordinates (by pixel) that are shaded at any time or at specific intervals during the year (or other period of time). Alternatively, if the user is operating without orthophotographic data, the XY/XYZ coordinates of the shading areas are separated from those outside the shaded area in the geographic plane.

In step 930, the extracted rooftop polygons/area boundary data are added to the programmable workspace, and rooftop data files and orientation point data are georeferenced in order to align the data on the XY plane, in step 935. Next, in step 940, the XY shadow simulation data (output from step 925) is intersected with the XY coordinates of the rooftop areas to generate a dataset of intersected rooftop polygons. All points/pixels that exist outside these coordinate boundaries are deleted.

In step 945, areas for the intersected rooftop polygons are calculated and stored as attributes, which contain the usable roof area after the intersection process. These calculated areas for each individual rooftop polygon contain the total non-shaded usable area per single parcel, and are stored in a rooftop polygon area file.

In step 950, the rooftop polygon area file is imported into the geodatabase 104, with all rooftop FIDs joined to parcel IDs and georeferenced. An output example of tabular data 955 indicating geographic coverage is shown below:

19 Palms Ave. Miami Fla. 33107—U_AREA 38.652288 m$^2$

21 Palms Ave, Miami Fla. 33107—U_AREA 47.576952 m$^2$

23 Palms Ave, Miami Fla. 33107—U_AREA 12.930998 m$^2$

Additionally, the total usable area may be multiplied by coordinate-specific solar irradiance levels to provide the actual output of solar potential for a given roof, as opposed to indicating the roof area in square meters.

Tabular Data

In FIG. 3, at step 130, all data is imported into the geodatabase 104 in tabular form, using GIS 110. In an exemplary embodiment, the data is calculated and categorized into parcel-specific tabular data 138, as indicated below.

Columns for data import contain:
(a) Roof space (total and portioned)
(b) Roof portion orientation
(c) Roof portion slope
(d) Usable area for solar optimization (annual shading on rooftops)
(e) Solar irradiance/insolation levels (adjusted per square meter)

These levels are calculated by multiplying the number of panels available to roof space by irradiance values for the local zone (e.g., 1280 w);
(f) Address and parcel value
(g) Object ID number (for spatial reference in a GIS)
(h) Parcel APN number (for municipal legal boundary reference)
(i) Parcel owner
(j) Roof geometry (gabled, complex etc.)
(k) Roof material (shingles, tiles etc.)—extracted with aerial/infrared spectrometer
(l) Return on Investment (ROI)—estimated ROI for the optimal system available to a homeowner may be calculated by multiplying irradiance levels per square meter by available usable roof space/solar panel model/output, cost of panels, etc.

Other optional demographics may be imported from other sources (e.g., household income, marital status, etc.).

Rows for data import are organized by joining spatially referenced Object ID numbers to Feature ID numbers, and Parcel (APN) numbers, as indicated previously. Mathematical calculations, such as extraction of irradiance levels (e) from usable area (d) can be completed inside or outside the database, using Microsoft Excel or other utility program.

Thematic layers may be used as data inputs to simplify the geometric relationships within the database. These layers are utilized to extract items (a) through (l) above. These thematic layers include some or all of the following:

Municipal land parcel data, including census block group data, parcel streets/addresses, and parcel frameworks;

Aerial/orthophotography, including LiDar and infrared LiDar roof and clutter data Digital Elevation Model(s) ground features as 3D XYZ data;

Geospatial climate dynamics (weather patterns, rainfall, cloud cover, temperature etc) at preferred/available grid resolution (e.g., 10 km$^2$, distributed point-specific weather station data);

Area-specific irradiance levels;

Infrared spectrum coverage by remote sensing;

Estimated return on investment—estimated kW/H per month of solar potential by parcel as adjusted by state and municipal rebate programs, hardware costs, etc.

In FIG. 3, at step 132, GIS database 104 receives spatial and tabular imports with the following characteristics:

Data must be standardized with respect to inputs and outputs; and

Data must be georeferenced correctly to adhere to established Cartesian spheroid projection.

Cartographic Data

Figure 10:
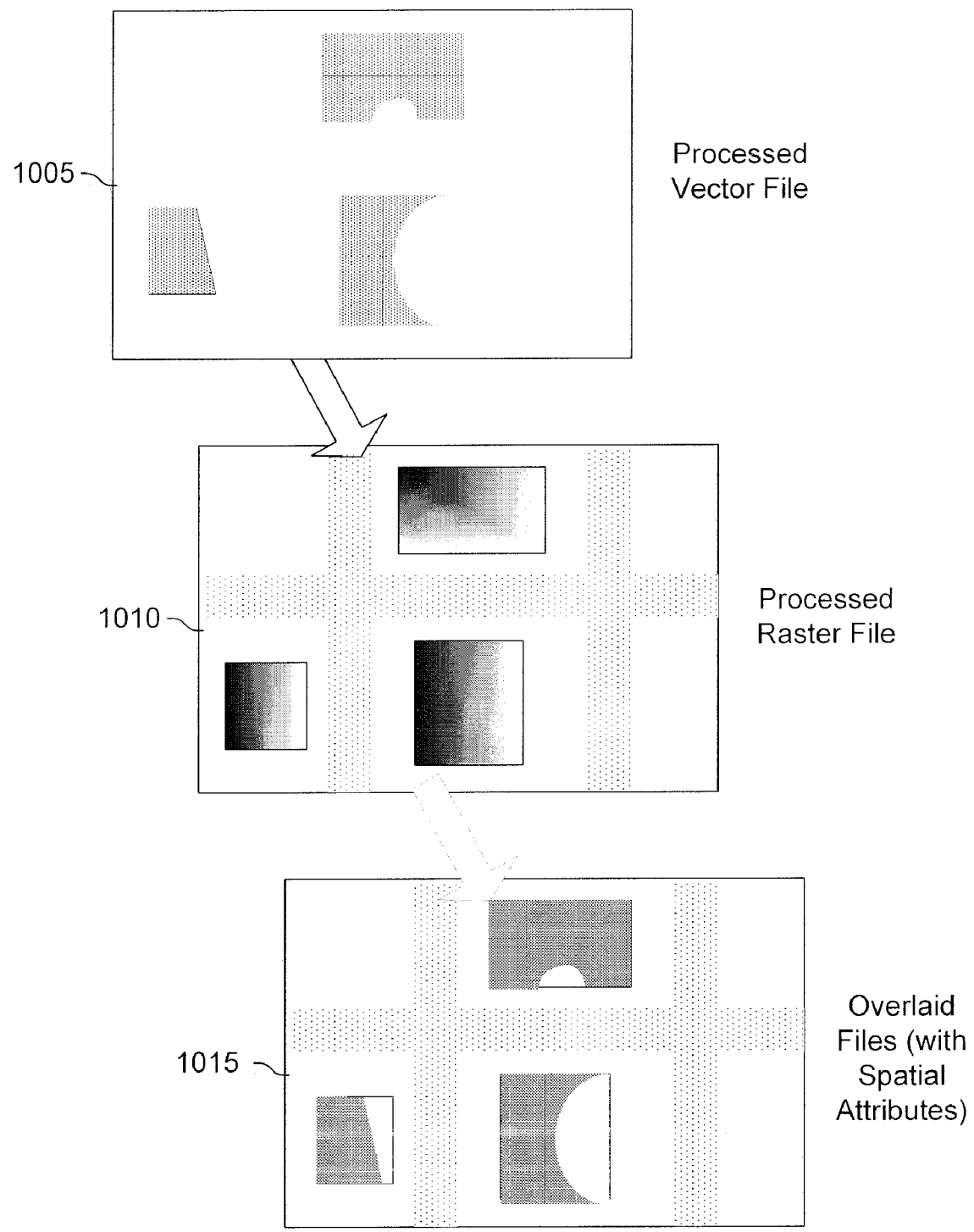
FIG. 10 is a flowchart showing exemplary details of a process for generating cartographic data.

FIG. 10 is a flowchart showing exemplary details of process 132 (in FIG. 3) for generating cartographic data 139. Initially, all spatial/vector files created by processes 120, 122, 105, 118, 112, 114, 116 and 104 are imported to geodatabase 104. A differentiation is made between the attributes of extracted data (tabular) and the spatial files (cartographic) in this step.

A greatly simplified sample of a processed vector file 1005 is shown in FIG. 10. In order to create this vector file 1005, aerial/orthophotographic files of same coverage/coordinates are imported into database 104. These files are georeferenced using the same cartographic spheroid (e.g., UTM Zone 17, Clarke 1866) as the original spatial/vector files. The orthophotographic layer is then clipped to the spatial boundaries of land parcel data and rooftop polygons. Object identification numbers are generated for each clipped orthophotograph and joined to appropriate spatial identification of the vector files to generate processed raster file 1010.

Layers 1005 and 1010 are then overlaid and bound cartographically in the GIS with spatial attributes for use (at steps 134 and 135 in FIG. 3) in the DBMS environment, to create overlaid raster files 1015 with spatial attributes. The inclusion of raster files facilitates the marketing of the present technology, and may be considered as part of the overall solar census process. However, a solar census can be achieved geometrically without the photography. Aerial photographs are not required in the geometric extraction process, as they are simply 2-D photos which provide visual assistance for a system user or a buyer of the service, and should be understood as functionally separate from the aerial photogrammetry referred to in FIG. 2A.

In an exemplary embodiment, raster file data is formatted into cartographic display 139, and tabular parcel-specific data is printed out as text 138. Both tabular data and cartographic data may be filtered at step 134 in accordance with user preferences by querying GIS database 104.

Generation of Temporal Solar Irradiance Values

Figure 11:
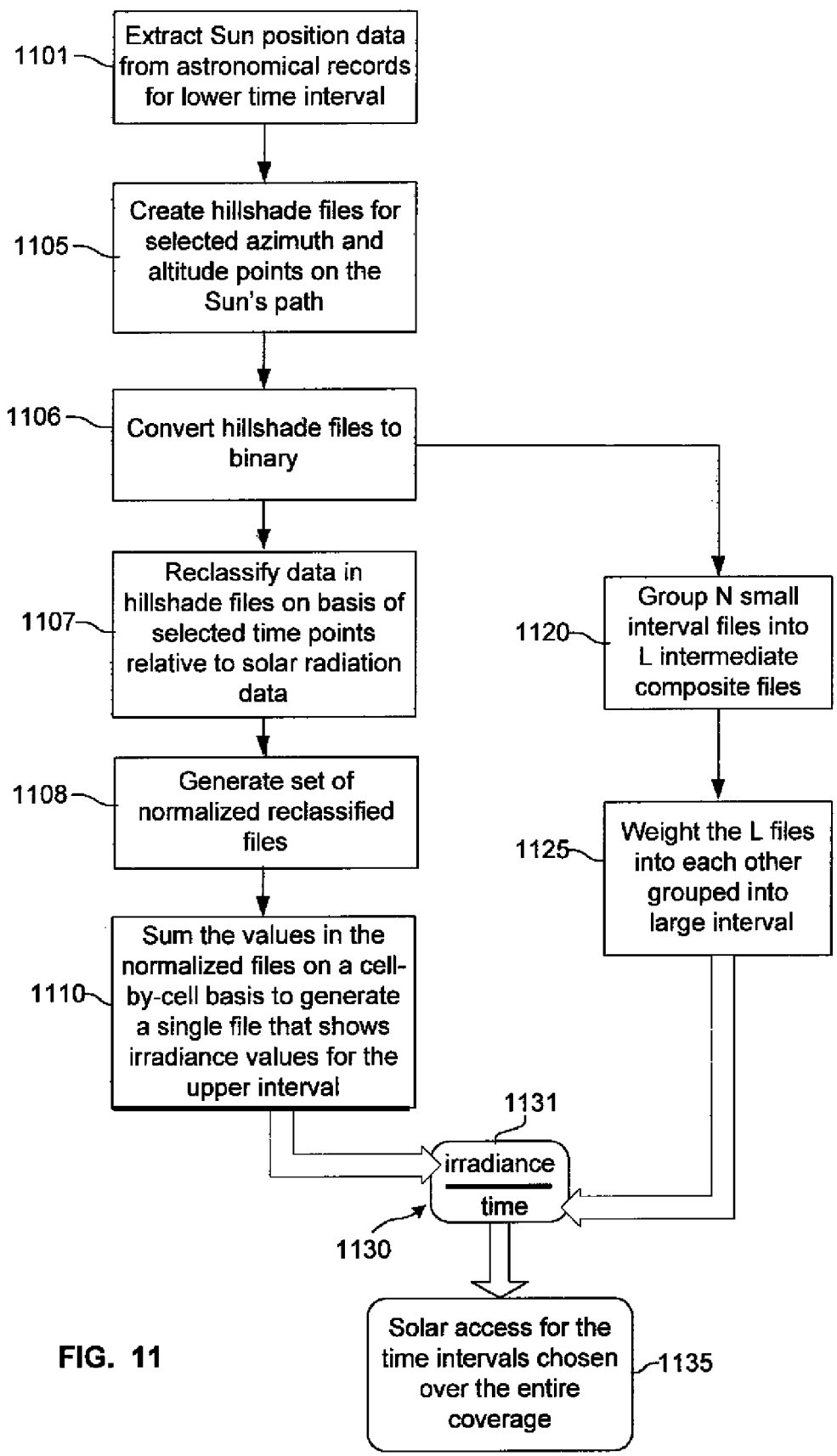
FIG. 11 is a flowchart showing exemplary details of a process for determining solar access values for specified intervals of time.

FIG. 11 is a flowchart showing exemplary details of a process for determining the percentage of total solar irradiance which is incident on certain areas, at least some of which are shaded from sunlight during a specific period of time. The present system follows the process shown in FIG. 11, as described below, to generate a data set 1135 representing this time-percentage of shading of a selected area, referred to herein as "solar access" data. In an exemplary embodiment, data is generated and processed in raster format. However, the process described herein can be performed using vector files or other types of files in lieu of raster files.

Figure 12:
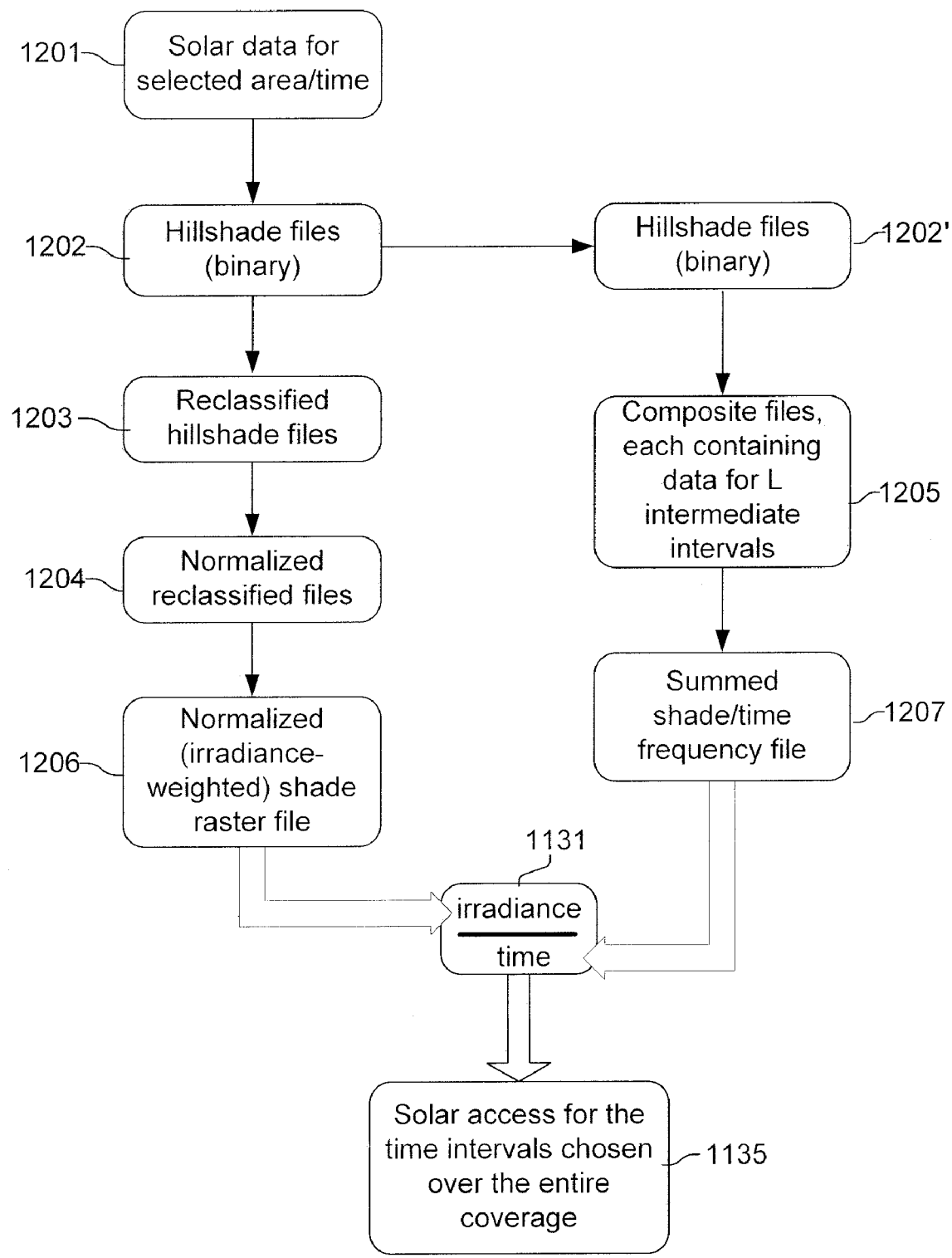
FIG. 12 is a diagram showing examples of data formats corresponding to the process shown in FIG. 11.

FIG. 12 is a diagram showing exemplary data formats corresponding to the process shown in FIG. 11. The data initially used in the present system is taken from Digital Elevation Models ('DEMs'), and/or equivalent XYZ file formats 142. This data is collected by means of remote sensing technology. For the purpose of the present document, it should be noted that a DEM may also be considered to be a 'virtual city' 111, as it is effectively a three-dimensional rendering of a coverage that includes three-dimensional man-made features of a city or other area in which those features are present. However, if the DEM is extracted for areas that do not contain man-made features, it is not a requirement for the data to contain such features. DEM data 107 meeting these requirements may be extracted from any digital elevation model or raw data format representing XYZ coordinates, regardless of resolution. In an exemplary embodiment, DEM data 107 is in raster (two-dimensional pixel array) format, but DEM data can also be held in ASCII/text formats, and TINs, etc. Operation of the present system is best understood by viewing FIGS. 11 and 12 in conjunction with FIGS. 13-21, as described below.

Figure 13:
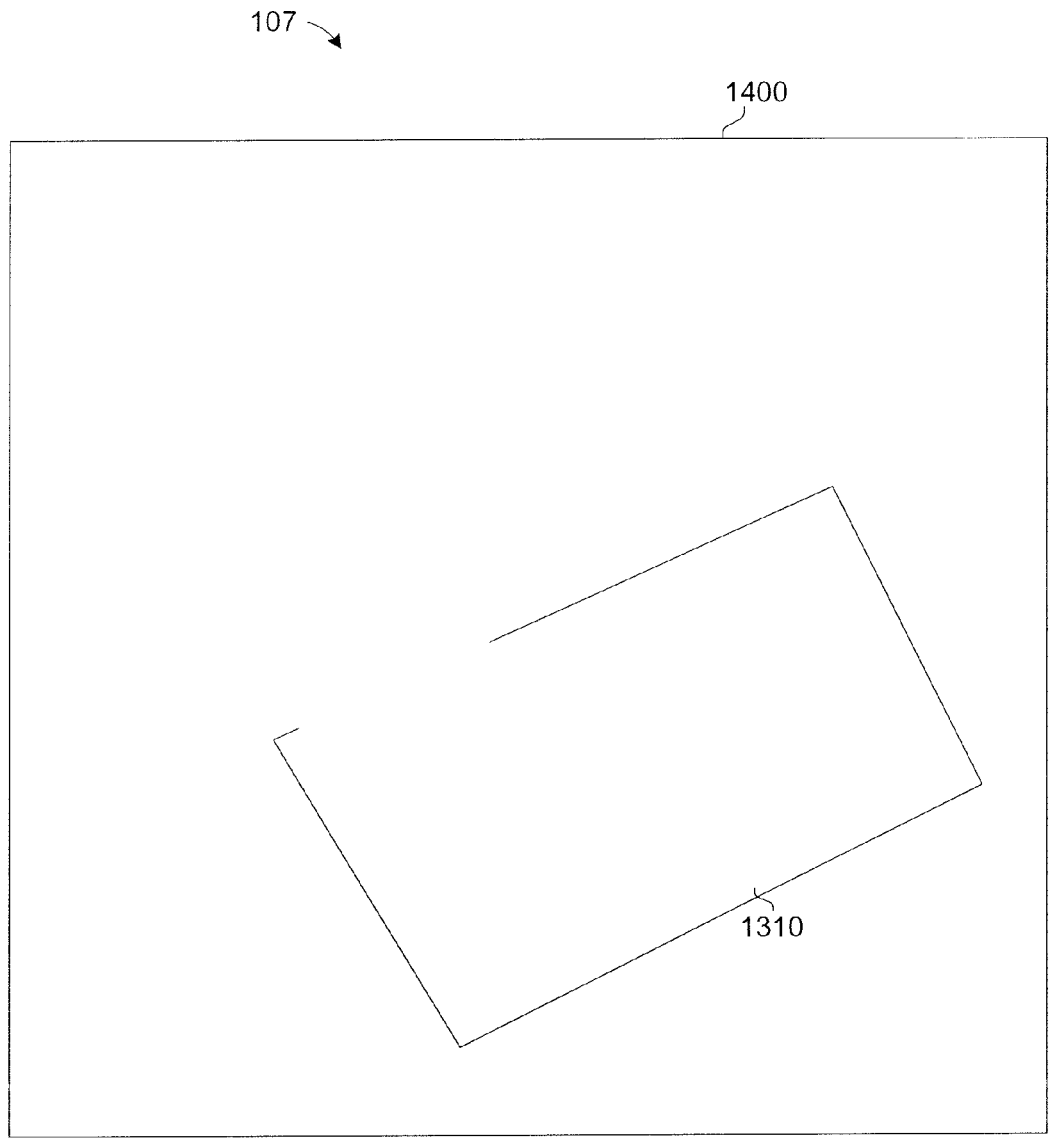
FIG. 13 is an exemplary diagram showing the extraction of a Digital Elevation Model from raw XYZ data.

FIG. 13 illustrates an example of a Digital Elevation Model 107 extracted from raw XYZ (three-dimensional) data for a specific area 1400, including a rooftop 1310, where the data is displayed in a raster format. The Z (elevation) values of the data are contained within the cells of the DEM, but are only apparent when viewed with a 3-D display program. As shown in FIGS. 11 and 12, at steps 1101 and 1105 (described in detail below), using DEM raw data 107 (from step 105, FIG. 2A, or from other sources noted below) 'hillshade' data files 1202 are created for a finite number of points on the Sun's path (i.e., for the Sun's azimuth and altitude relative to the location and time points being analyzed) for selected time intervals or points. The present system extracts individual temporal solar irradiance values for every point in a particular coverage area while simulating the Sun's path across the area. Each hillshade file 1202 is then converted from a signed, continuous raster surface to a discrete binary format on a cell-by-cell basis. In an exemplary embodiment, the resultant binary shade file 1202 is a dataset or file of binary numbers, each representing either a shadow or a non-shadow condition of a specific area, e.g., a 1 sq. ft. area at a specific X/Y coordinate, where each file includes data for a specific point in time at specified XY boundaries. The data is stored in individual files 1202 as binary code representing shadow and non-shadow. In an exemplary embodiment, hillshade data files 1202 are stored as 16-bit integer rasters, although the files may be stored as ASCII text, other text, or shapefiles, etc.

Shaded relief, or hill-shading, simulates the cast shadow thrown upon a raised relief map, or more abstractly, upon the planetary surface represented. The conventional angle of the light source for such models is from the northwest (i.e., normally from the upper left corner of the map). This makes most depictions in the northern latitudes non-representative of solar light/shadow patterns, and is done conventionally to avoid multistable perception illusions (i.e., crater/hill confusion). Because the viewer is looking at a printed or displayed image, the default assumption is that light is coming from above. Each hillshade file 1202 is representative of the sun's apparent position on the sky at a specific time and day of the year.

As shown in FIG. 11, using astronomical positions of the sun relative to latitude and longitude (X/Y coordinates) on Earth, extracted from public records at step 1101, a 'hillshade' or shaded relief file 1202, relative to the irradiance time point, is created from the raw DEM data 107, at step 1105. At step 1106, hillshade files 1202 are converted to raw binary data.

Figure 14A:
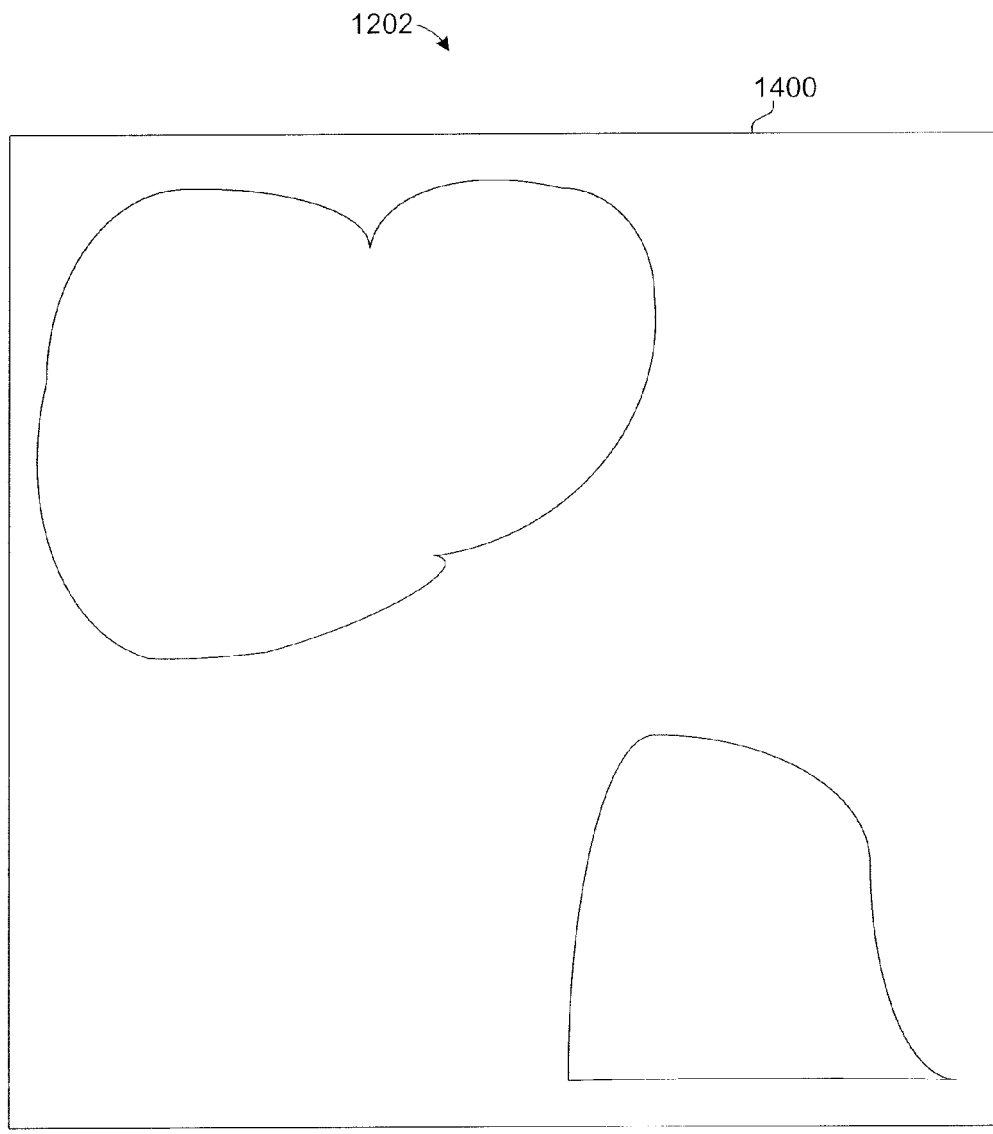
FIG. 14A is an exemplary diagram showing an example of a hillshade file for a specific area.
Figure 14B:
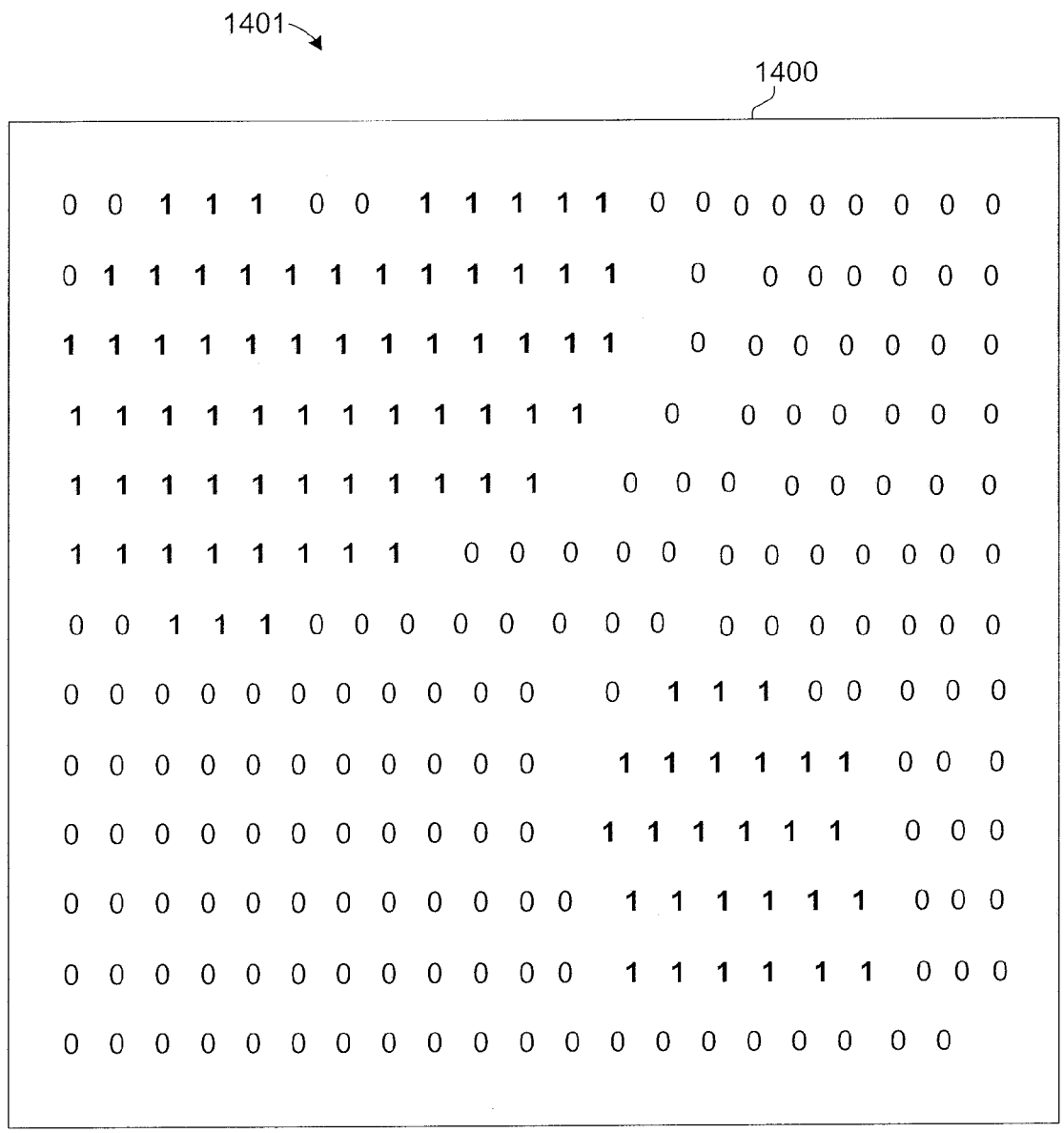
FIG. 14B shows the diagram of FIG. 14A in a binary format.
Figure 15:
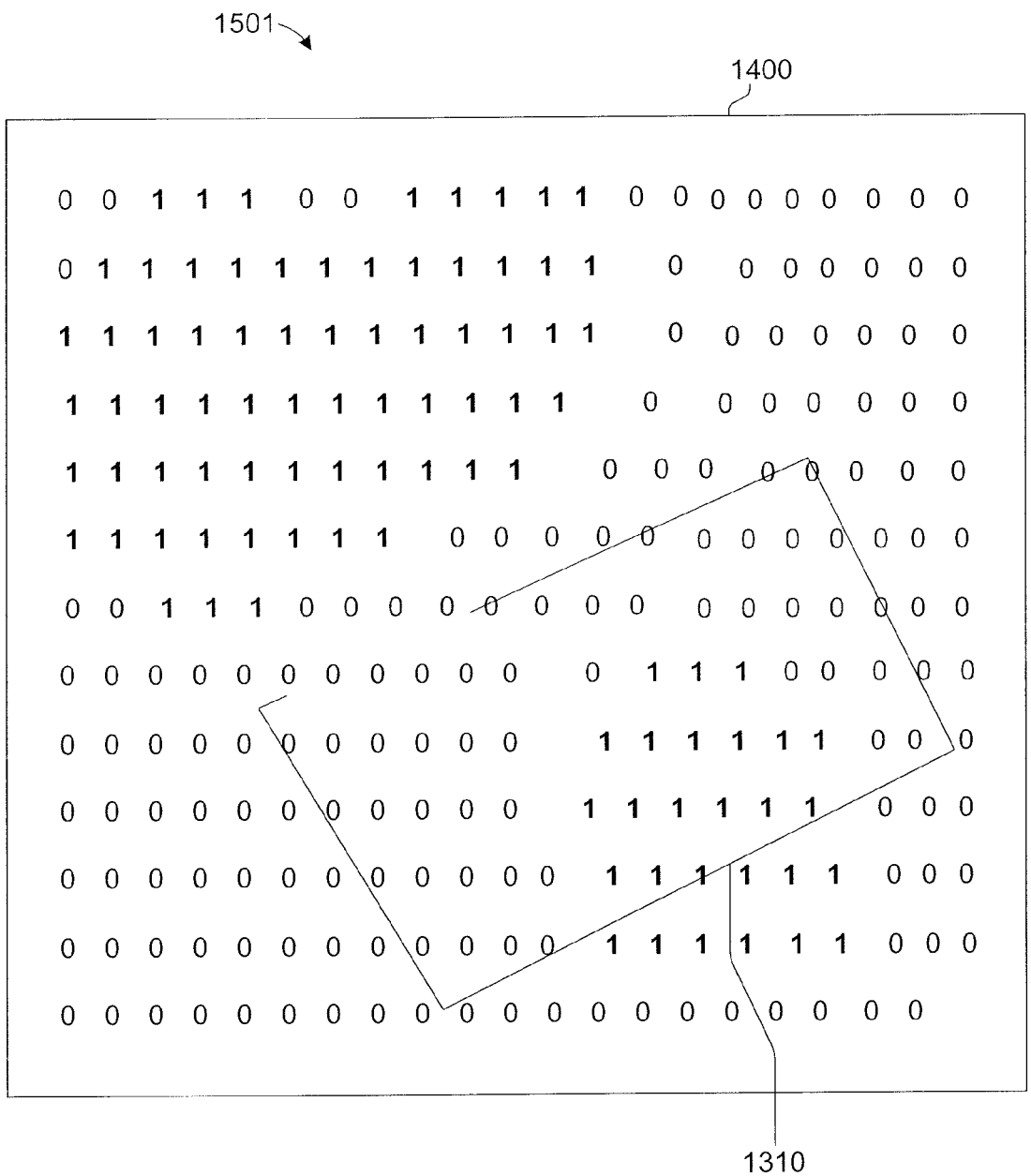
FIG. 15 is an exemplary diagram showing the raw binary data for a hillshade file superimposed over the original DEM data for the same area.
Figure 16:
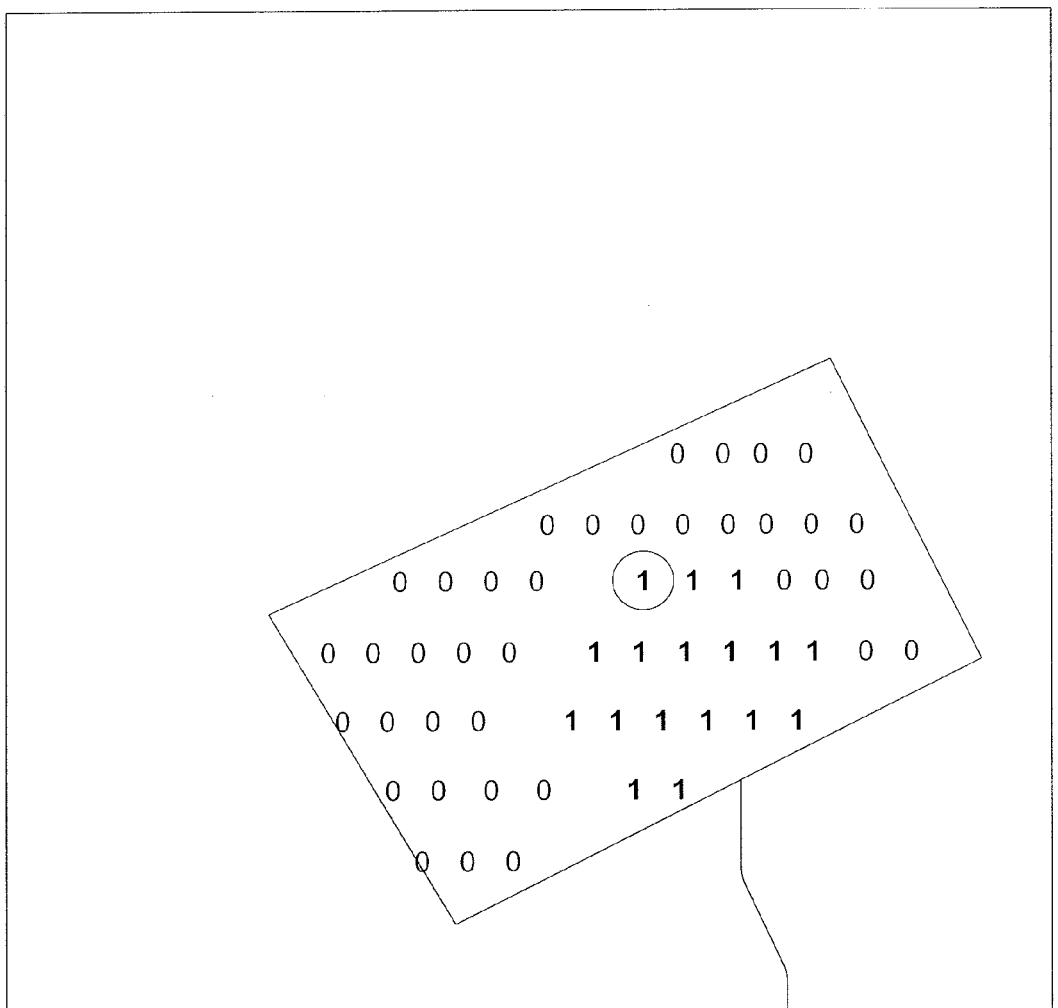
FIG. 16 is an exemplary diagram showing hillshade file binary data for the area over rooftop 1310.

FIG. 14A illustrates an example of a 'hillshade' file 1202 for the same area 1400 as shown in FIG. 13, and FIG. 14B shows the diagram of FIG. 14A, where the layer of data 1202 is converted from raster format to text format 1401. FIG. 15 shows the superposition 1501 of the raw binary data for hillshade file 1202 over the original DEM data 107 (of FIG. 13) for area 1400, and FIG. 16 shows a subset 1601 of the same hillshade data for the area over rooftop 1310.

Table 1, below, shows an example of the relevant percent of total daily radiation represented by a given hour for a specific area, and is generated from the binary values in the hillshade data in file 1202. The data in Table 1 represents the 'curve' of the Sun's path through the sky. In an exemplary embodiment, the data in Table 1 is constructed by extracting the files for the latitude and longitude of a particular area from solar data files prepared by the National Renewable Energy Laboratory (NREL). These data files give a historical average of radiation recorded throughout the country. The data in these files is split in hourly intervals for every day of the year. By generating a simple distribution curve from the raw data, the data can be reordered to give a percentage of total radiation for a given time interval within any other time interval.

Each hillshade file 1202 is then 'reclassified', at step 1107, based on irradiance levels representing each selected time point, e.g., each hour, in the Sun's path for the corresponding day, to generate 'reclassified' shade files 1203. Solar altitude and azimuth positions for a specific latitude and longitude at a specific time in a year can be found, for example, at the US Naval Observatory website (http://aa.usno.navy.mil/data/). If, for example, azimuth=23.3 and altitude=145.2 on January 15, at 10:00-11:00 PM (shown in Table 2), this time point has a value of 12.67, as indicated in the solar radiation values in Table 1. This time point value (12.67) represents the value for solar insolation/radiation during this specific period of time. Every 'reclassified' time point value during a given day thus represents the percentage of total radiation during that day for a specific latitude and longitude.

The conversion chart, or 'reclassification' chart created in step 1107 is shown, in part, in Table 1, below.

TABLE 1

|  | 7:00 | 8:00 | 9:00 | 10:00 | 11:00 | 12:00 | 1:00 | 2:00 | 3:00 | 4:00 |
|---|---|---|---|---|---|---|---|---|---|---|
| January | 1.79 | 7.25 | 10.50 | 12.67 | 13.80 | 14.05 | 13.52 | 12.76 | 10.99 | 2.67 |
| February | 3.84 | 7.91 | 10.09 | 11.46 | 12.12 | 11.38 | 11.33 | 9.95 | 9.95 | 7.46 |
| March | 5.82 | 8.19 | 9.83 | 10.52 | 11.42 | 11.46 | 11.33 | 10.67 | 9.33 | 7.94 |

An exemplary set of reclassified files 1203 is shown in Table 2, below. These files may be considered as layers—there may be, for example, 10 layers, each of which represents the Sun's shadow at a certain time for a particular area for every hour from 8 am to 5 pm. Each of these raster layers can be viewed independently, and each layer has a converted cell value attached to it for the relevant portion of the day's shade it represents. Thus, if a shade file is generated for 9 am, and the file represents 4% of the day's total radiation, every cell which currently has a value of 1 (where a value of 0=non-shaded, and 1=shaded) is converted in step 1108 (described below) to a '4'.

The purpose of the reclassified data (in files 1203) is to provide a conversion of the existing binary data (based on position and time) to solar radiation (solar access) data. Table 2, below, shows exemplary reclassified data based on the data in Table 1.

TABLE 2

Jan. 15$^{th}$ (San Jose, CA)

| Time | AZ | AL | % Solar Access Loss if Shadded | Hillshade File Name Being Reclassified |
|---|---|---|---|---|
| 7:00 | −4.6 | 113.2 | 1.79 | recl_1 |
| 8:00 | 6.1 | 122.4 | 7.25 | recl_2 |
| 9:00 | 15.5 | 132.9 | 10.50 | recl_3 |
| 10:00 | 23.3 | 145.2 | 12.67 | recl_4 |
| 11:00 | 28.9 | 159.5 | 13.80 | recl_5 |
| 12:00 | 31.5 | 175.4 | 14.05 | recl_6 |
| 13:00 | 30.7 | 191.7 | 13.52 | recl_7 |
| 14:00 | 26.8 | 207.0 | 12.76 | recl_8 |
| 15:00 | 20.2 | 220.4 | 10.99 | recl_9 |
| 16:00 | 11.6 | 231.9 | 2.67 | recl_10 |

After all of the binary hillshade files 1202 are converted to reclassified files 1203, the files are then weighted or normalized and combined by their normalized values, as described below, to generate a set of normalized (summed/irradiance-weighted) files 1204, so that the data (which comprises the individual shade files generated in steps 120-122 of FIG. 3), when summed, has a total value of 100%.

Figure 17A:
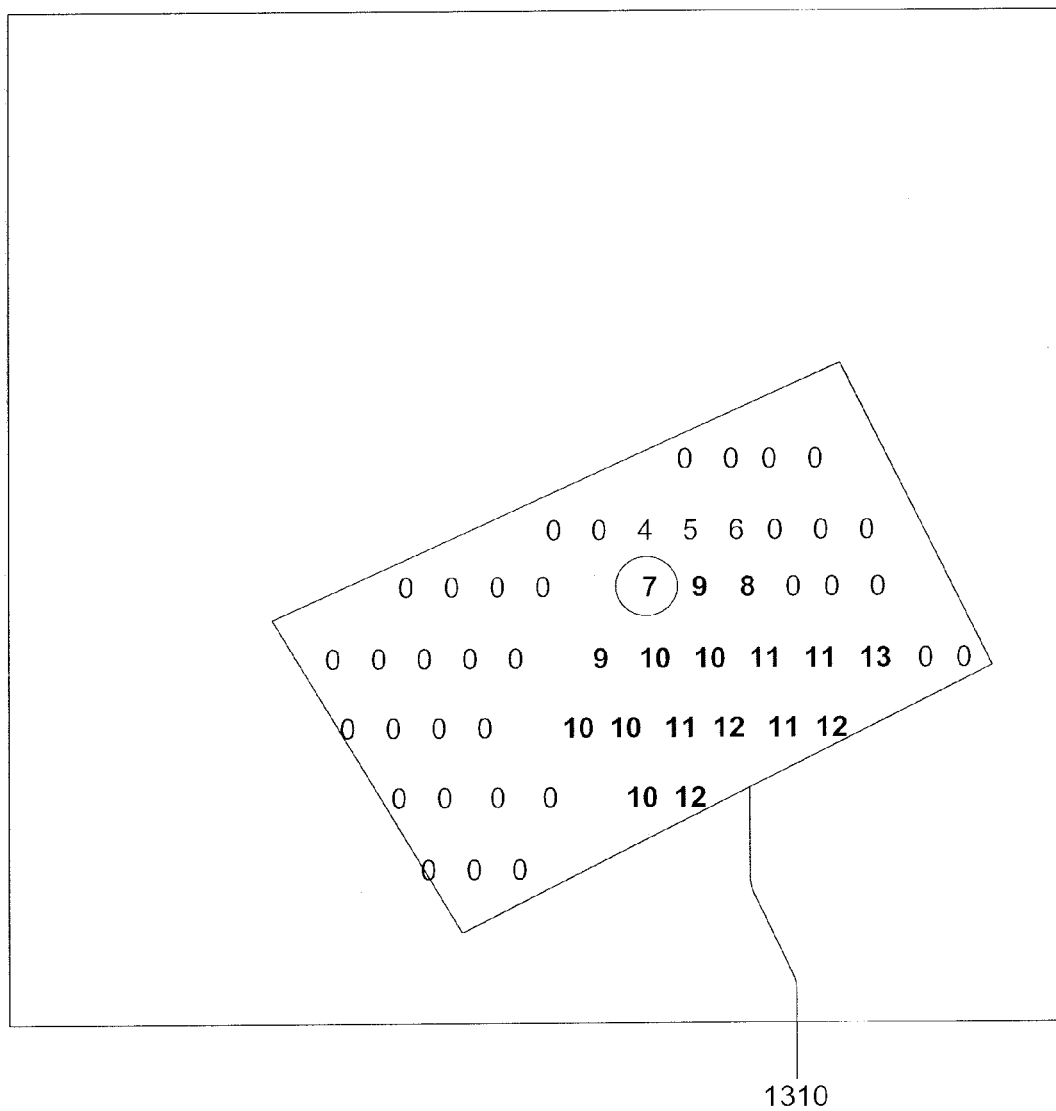
FIGS. 17A, 17B, and 17C are exemplary diagrams showing three respective sets of reclassified data for the area over rooftop 1310.
Figure 17B:
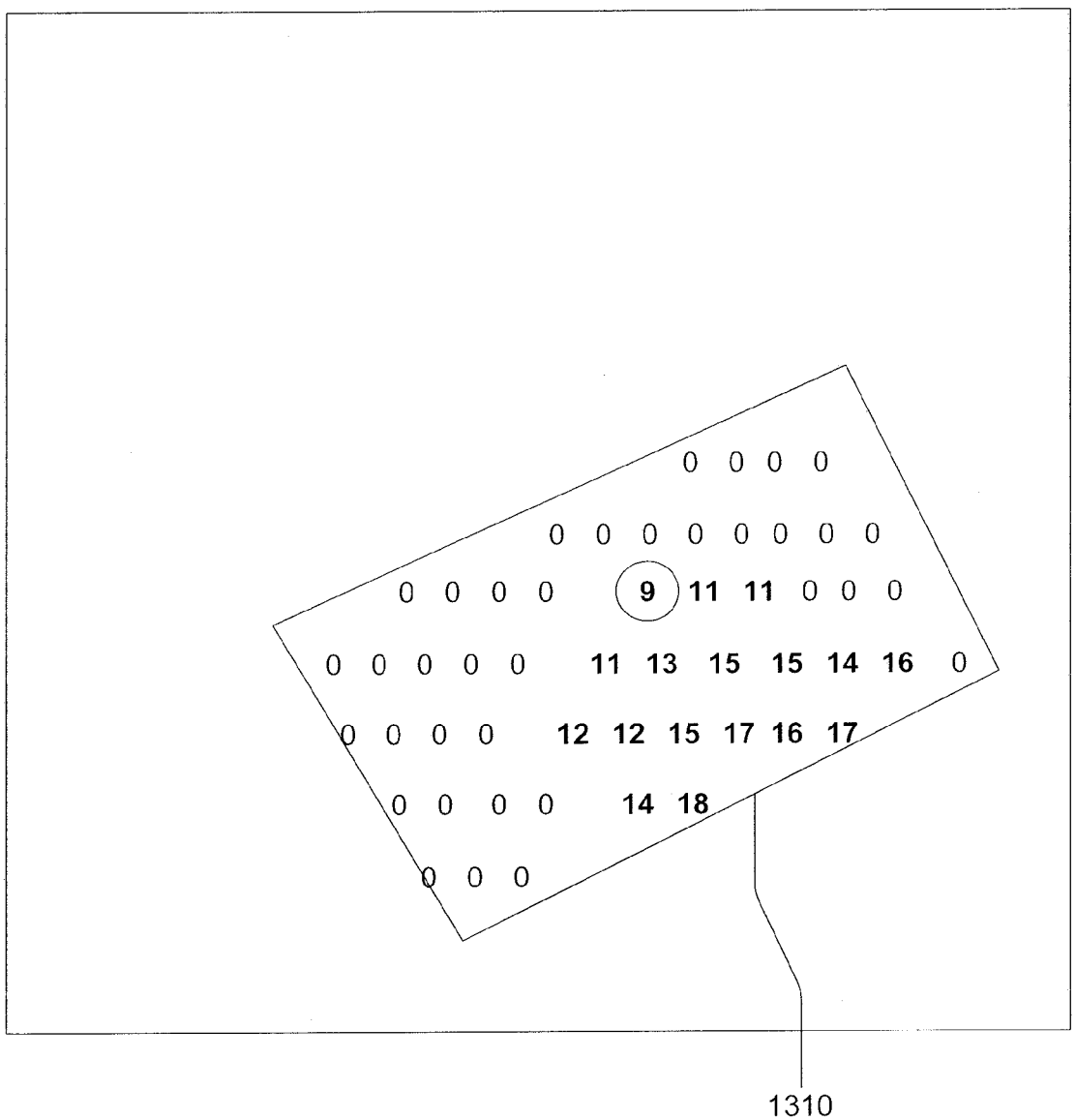
Figure 17C:
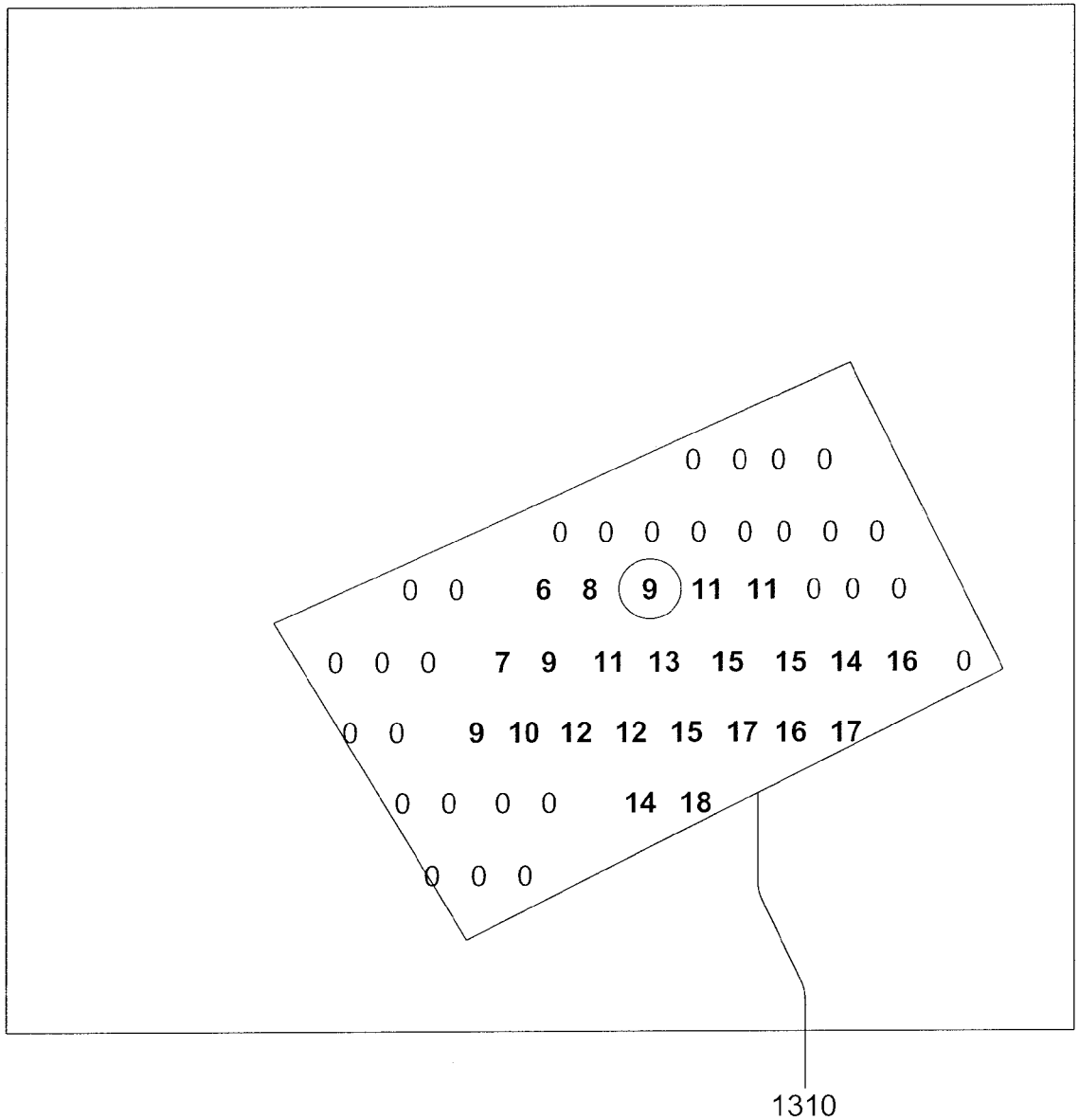

FIGS. 17A, 17B, and 17C are exemplary diagrams showing three sets of binary data 1701/1702/1703 representing hillshade files 1203 for the area over rooftop 1310, after being reclassified from their counterpart binary hillshade files 1202 to indicate the respective solar access values. Each of the hillshade files 1203 preferably includes data for one of a selected number of different time points (e.g., hours) for a selected number of intermediate intervals (e.g., days) in a selected upper interval (e.g., a month), although, alternatively, hillshade file data for the same time points for different intermediate intervals in the upper interval may be used. The present process comprises the conversion of a visual file (from a DEM, which has features) to a text/binary file with no features, only zeros and ones bound to coordinates, where, for example, a '1' (indicated by the circled value in FIG. 16) is converted to a '7' (indicated by the circled value in FIG. 17A) on one file/layer, and above that layer, another '1' in another layer at exactly the same point on the grid (representing area 1400) is converted to, for example, a value of 9 (indicated by the circled value in FIG. 17B). The same conversion process is applied to the remaining hillshade files 1202 (a single remaining file in the present example) in the upper interval to generate file 1703 shown in FIG. 17C.

Unique values between 1 and 100, representing the percentage of total radiation during that day for the chosen latitude and longitude, are calculated in step 1110 (described in detail below). In effect, a fourth dimension is introduced here. In a single shade file, the shadow is frozen. However, over a period of time, the effect of a moving shadow comes into play. When the 'weighted' percent shade value has a zero value, there will always be a zero in the original binary data in the corresponding 'still frame' hillshade file 1202, because shade never touches this cell, regardless of the timeline. Thus, a zero in a cell in a one-day weighted file (e.g., June 12) will mandate a zero in a hillshade at 10 am, but not past the day of June 12th. A zero in a weighted file for the entire month of June will guarantee a zero on every hillshade file generated within that month, but not in files in other months, and so on.

In step 1108, the set of normalized, reclassified files 1204 is generated by summing groups of reclassified hillshade files 1203, wherein each file 1204 represents the sum of all of the appropriate normalized files 1203 for a chosen lower interval within a selected intermediate interval. In the present example, the lower interval is one hour, and the intermediate interval is one day, thus each file 1204 represents the sum of all of the files 1203 for one day.

Figure 18:
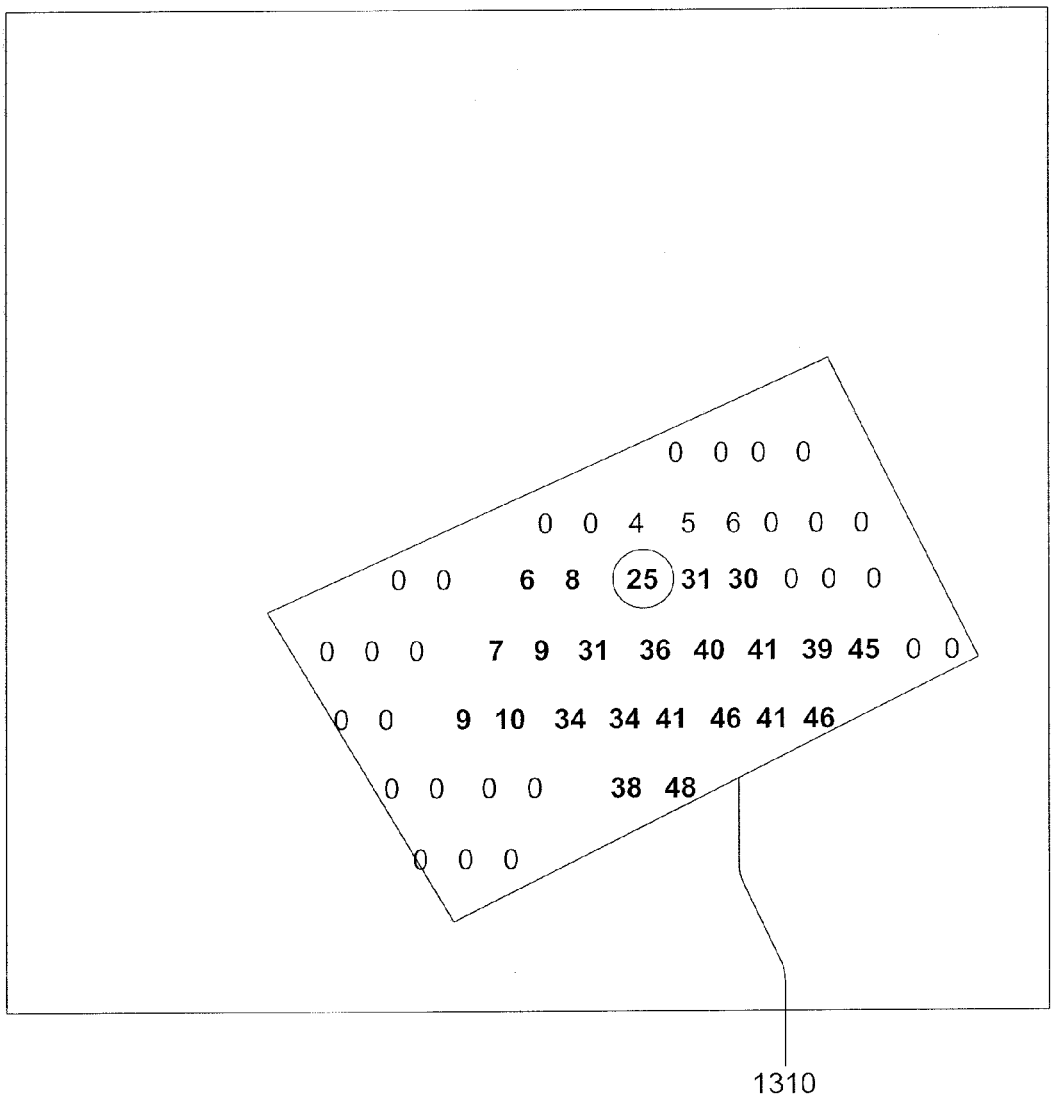
FIG. 18 is an exemplary diagram showing summed data 1801 from sets 1701, 1702, and 1703.

FIG. 18 is an exemplary diagram showing data 1801 summed from files 1701, 1702, and 1703 (each of which is a binary hillshade file 1203) to create normalized file 1204, generated in step 1108. In an exemplary embodiment, information is extracted for the percentage of total radiation (i.e., solar access) in one hour time units which constitute a 'lower interval' for the extraction/processing of data in the present system. This lower interval is determined by the interval at which hillshade file data 1202 was extracted in step 1101. Hillshade files 1202 created in step 1105 of FIG. 11 are thus based on one hour intervals in the present example, although any other time interval may be used.

The reclassified data 1203 shown in FIGS. 17A-17C now includes values that can be 'summed' or 'weighted' in any specified time interval. Once the desired time intervals are chosen, the values in the raster files are summed or weighted on a cell-by-cell (e.g., on a pixel-by-pixel) basis, in step 1110, as described below. For the purpose of the present description, a 'cell' may be considered to be a single pixel of data. For example, to calculate the total effect of irradiance for one day, all of the reclassified values generated within that day are weighted, and the result is a single raster/file that shows irradiance values for that day. The same can be done for one month, one season, or one year, etc. These irradiance-weighted, or normalized raster files 1204 represent the total (weighted) irradiance for the selected period of time.

In an exemplary embodiment, the normalized/weighted data is sorted by using different 60 minute points for each of a selected number of days of a month. For example, on January 1, data for 8 AM, 9:30 AM, 11 AM, and so on, is generated. On January 15, data for 8:30 AM, 10 AM, 11:30 AM, etc., is generated, and this process is repeated for each of the remaining days selected in the month. This procedure reduces data calculation, and thus requires less processing. This process can be made more finely-grained to achieve higher resolution results.

In an alternative embodiment, direct summing of irradiance values for every cell is employed, as described above, eliminating the step of calculating the denominator in equation 1130 (described below). This process requires only the determination of data comprising the numerator of equation 1130, based on irradiance data. This alternative method can be used, for example, for predicting the total output of a particular solar energy system over a period of time, and determining related information, such as ROI (return on investment) over the lifespan of solar cells, etc. The purpose of this embodiment is to calculate time-dependent irradiance values which are summed over an interval, without being averaged.

In a second alternative embodiment, slope and aspect data is added on a cell by cell basis to generate irradiance maps which may include man-made features. For this process, standardized multipliers are applied over the system outputs. More specifically, the extracted irradiance value (over time) of each cell is a function of (and is computed from) the slope value of the same cell, and the aspect value of the same cell. This process, which provides increased accuracy for the values per cell over a particular coverage area, may be implemented using either the method described immediately above, or using the general method described in the remainder of this document.

Figure 19A:
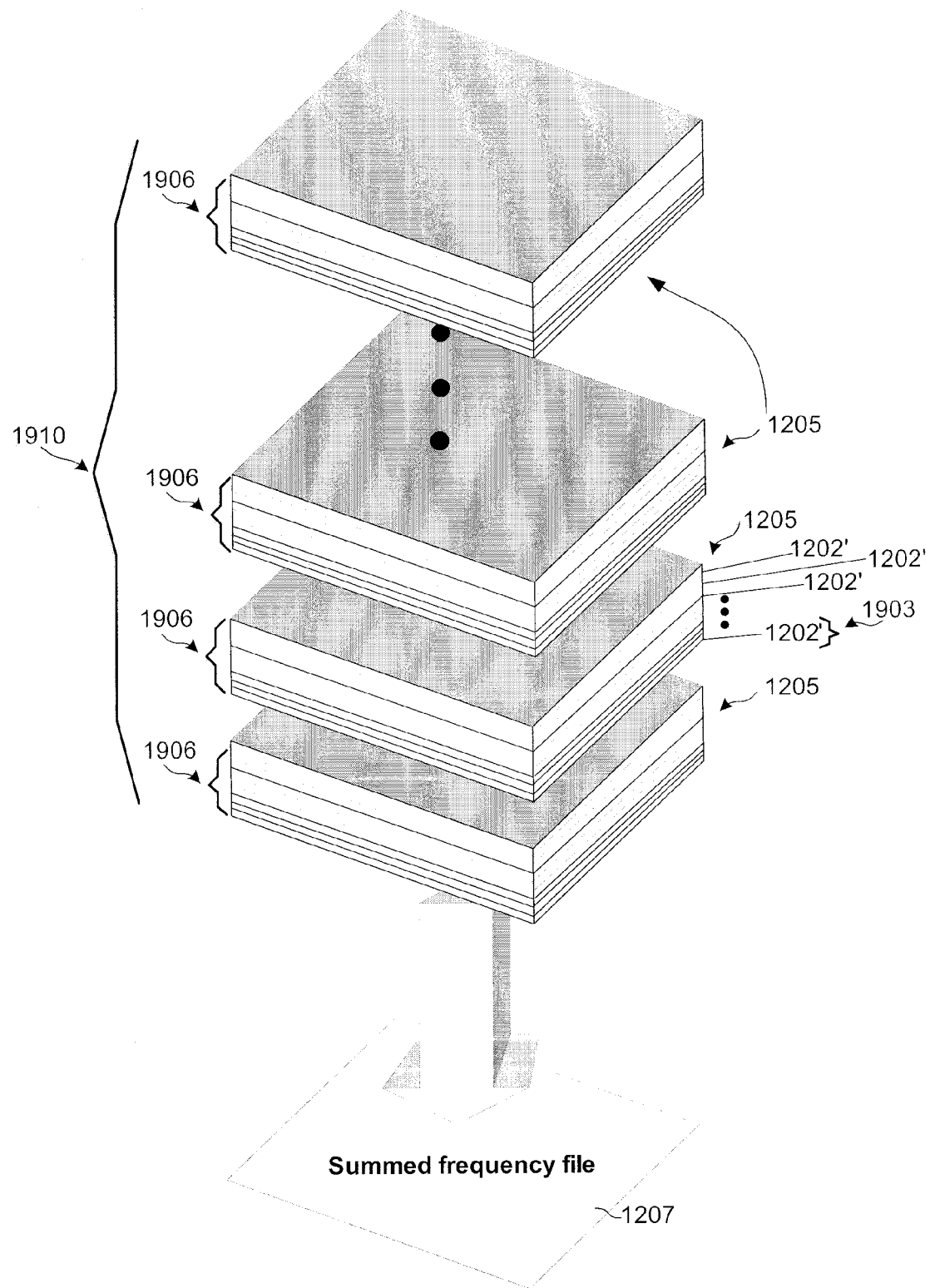
FIG. 19A is an exemplary diagram showing the generation of a composite file from a file set which includes sets of hillshade files.

In step 1110, data for a lower interval 1903 in reclassified files 1204 is summed for a each of a plurality of intermediate intervals 1906 within an upper time interval 1910, on a cell-by-cell basis, to generate a single normalized (irradiance-weighted) shade raster file 1206 for an upper time interval 1910 (these intervals are shown in FIG. 19A, described below). In the present example, the intermediate interval is one day and there are, e.g., seven intermediate intervals in the upper interval of one month. The irradiance-weighted raster file 1206 forms the numerator of equation 1130 (shown below), and represents the upper interval 1910. This intermediate interval is expressed in units to which the percent values in FIG. 11, step 1101 are relative. Note that the entire numerator generation process uses a framework of intermediate interval units. Since the data in normalized files 1206 is weighted for multiple days, the division operation (performed in step 1131, as described below) indicated in equation 1130 is required to adjust the average to correspond to the selected intermediate interval.

$$\frac{\text{Irradiance}}{\text{Time/repetition interval}} = \text{Total solar access for interval} \quad \text{Equation 1130}$$

In the present example, data from sets 1701, 1702, and 1703 is summed in step 1110 to create the output file 1801 (an example of file 1206) shown in FIG. 18. In the resultant summed/normalized file 1801, a new value of 25 (indicated by the circled value in FIG. 18A) is generated for the point on the grid corresponding to the circled cells in FIGS. 17A, 17B, and 17C. The remaining values shown in FIG. 18A are generated in like fashion by summing the respective values in FIGS. 17A-17C.

The same intermediate time interval is employed consistently in both the numerator and the denominator of equation 1130. When creating the numerator in equation 1130, all percent values for various hours are summed over one or more intermediate time units (e.g., days) from data sets 1701-1703 within the upper interval (e.g., a month). Thus, the largest time unit (the upper interval) for the summing process in step 1110 is the same time unit as the unit applied for this weighting/summing step of the denominator of equation 1130.

Figure 19B:
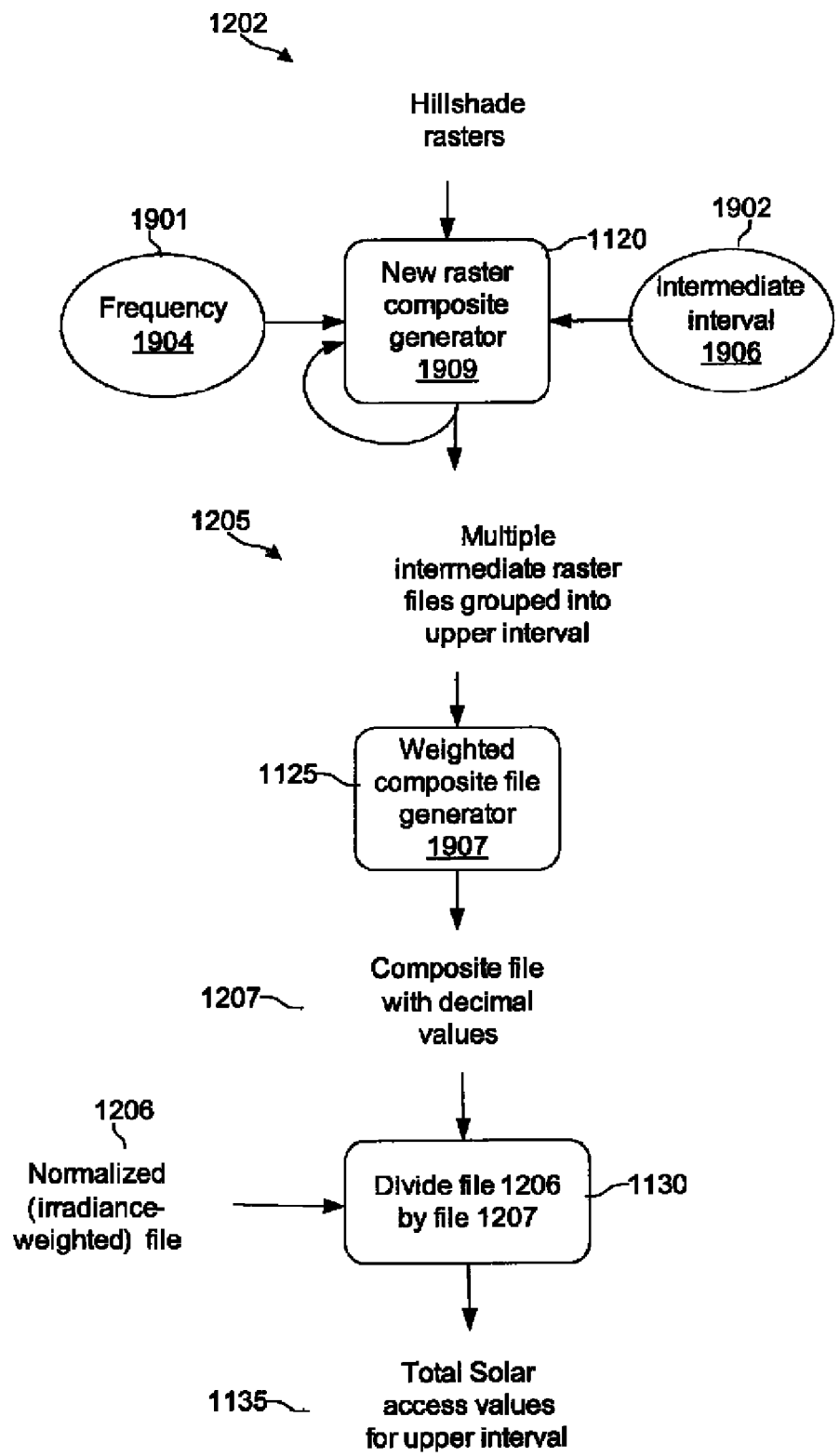
FIG. 19B is an exemplary diagram showing the process of composite-to-new raster generation.

Steps 1120-1125 in FIG. 11 show an exemplary process similar to that described above in steps 1101-1110. In these steps, the data is assembled based on a hierarchy of specific time intervals. FIG. 19A is an exemplary diagram showing the generation of a summed, time-ranked hillshade frequency file 1207. FIG. 19B is an exemplary data model showing process of composite-to-new raster generation, further detailing steps 1120 and 1125 in FIG. 11. Operation of the present system is best understood by viewing FIGS. 19A and 19B in conjunction with one another.

As shown in FIG. 19A, lower intervals 1903 of data, i.e., data representing time units smaller than a corresponding intermediate interval 1906 (a week in the present example), may be considered as being contained inside each intermediate interval 1906. Data is grouped in intermediate intervals within a larger upper interval 1910, e.g., a month. In FIG. 19A, lower time interval 1903 is shown as being equivalent to the interval represented by each of the hillshade files 1202'. These lower intervals 1903, by which hillshade files 1202' are grouped within each file 1205, can be minutes, hours, or any other units of time which are smaller than the intermediate time interval. In the present example, these lower intervals 1903 are hours, and the intermediate interval 1906 represents a 'container' in which data for lower intervals of hillshade files 1202' are collected for layering. If the intermediate interval is a day, there are up to 24 (or 14 for daylight hours) hourly hillshade files that are layered. If the upper interval 1910 is a month and there is one hillshade file 1202' generated for noon every day, then 30 hillshade files 1202', in binary format, are layered and summed. The composite intermediate interval files 1205 are grouped as indicated by the sets of files 1205 in grouping 1910 shown in FIG. 19A.

In the present example, as shown in FIG. 19B, the frequency (per lower interval 1903) of hillshade files 1202/1202' is daily. Therefore, as shown in FIG. 19B, a frequency value 1904 of 'hourly' is input to generator 1905 at step 1901. The intermediate interval 1906 in the time interval hierarchy is then chosen, at step 1902. In the present example, the intermediate interval is one day.

As shown in FIGS. 11, 19A, and 19B, once the preferred intermediate interval 1906 is determined, all hourly, or other lower interval, hillshade files 1202' generated in steps 1105/1106 for the lower time interval are layered (i.e., corresponding cell values in each file are inclusively 'OR'-ed into a single composite file 1205 by generator 1909, in step 1120. In step 1120, these files are grouped via whatever sorting process is desired. For example, if shade files have been generated for every hour of the day for 7 days in the month, and it is desired to extract a percentage of total daily radiation lost from shading effects for that month, the files are grouped into sets representing single days. Thus, in the example shown in Tables 1 and 2, single hourly interval data for January 15 is grouped into each of 7 files, and at step 1120 a 'composite' is formed from the files to create composite hillshade frequency file 1207 having decimal (i.e., non-binary) data for each day in the chosen upper interval. This new file 1207 represents all spatial (X,Y) coverage for shaded and non-shaded areas in each of the intermediate intervals (e.g., each day of seven selected days in the month). Note that the initial data (set 1201) used in step 1120 is the same as the data 122 from step 120 in FIG. 2A.

At this point, an upper interval set 1910 of binary files 1205 (where, e.g., 0=non-shaded, 1=shaded) has been created for each intermediate interval 1906 (e.g., a day), where each file 1205 is a composite (a layered data set) of hillshade files 1202' representing 'L' lower intervals (e.g., hours) constrained by the intermediate interval size 1906 (one day in the present case) and representing the total XY extent of solar access/shade effects over the time period chosen.

In the present example, the goal is to determine the average daily solar irradiance values, or solar access, for a particular month for a given set of cells. Now that data for each of the days (the intermediate interval) have been layered into a set of files 1910, the daily values, contained within a single file 1205 representing binary shade values for the entire day, are weighted on a cell by cell basis to create the summed frequency file 1207 containing weighted values within the upper interval, which is one month in the present example.

Once a composite file 1205 (which remains as per-cell binary code) for each of the days in intermediate interval 1906 is created, these intermediate interval files are summed, at step 1125. The result is a single summed shade/time frequency file 1207 in which each cell represents the frequency of repetition of small interval files for the chosen upper time interval. Cells range in value from 0 to N, where N is the number of days over which an area is being evaluated.

Summed shade/time frequency file 1207 (which is no longer a file with binary data, but one containing decimal [base 10] integer values) generated in step 1125 provides the frequency of hillshade file overlap or 'frequency of repetition' for every cell in the coverage that was summed in the numerator of equation 1130. With the creation of the denominator of equation 1130, i.e., file 1207, cells in the denominator file (in the present example) will have one of four possible values—a value of 0, indicating that the area represented by the cell is never shaded, or values of 1, 2, or 3, indicating the frequency of repetition of corresponding hillshade small interval time point data within the selected upper interval.

Therefore, at step 1131, the output from step 1110 (file 1206) is divided by the output of step 1125 (file 1207), using a matrix division operation, to provide the average percent of solar access per cell for the period of the upper interval. The outputs from steps 1110 and 1125 are operated on in accordance with equation 1130:

$$\frac{\text{Irradiance (not time adjusted)}}{\text{Repetition interval}} = \text{Total solar access for interval}$$

The output of equation 1130 represents the solar access, or total percentage of daily radiation shade (per cell) 1135 for the upper time interval 1910 over the entire coverage area that has been analyzed.

Figure 20:
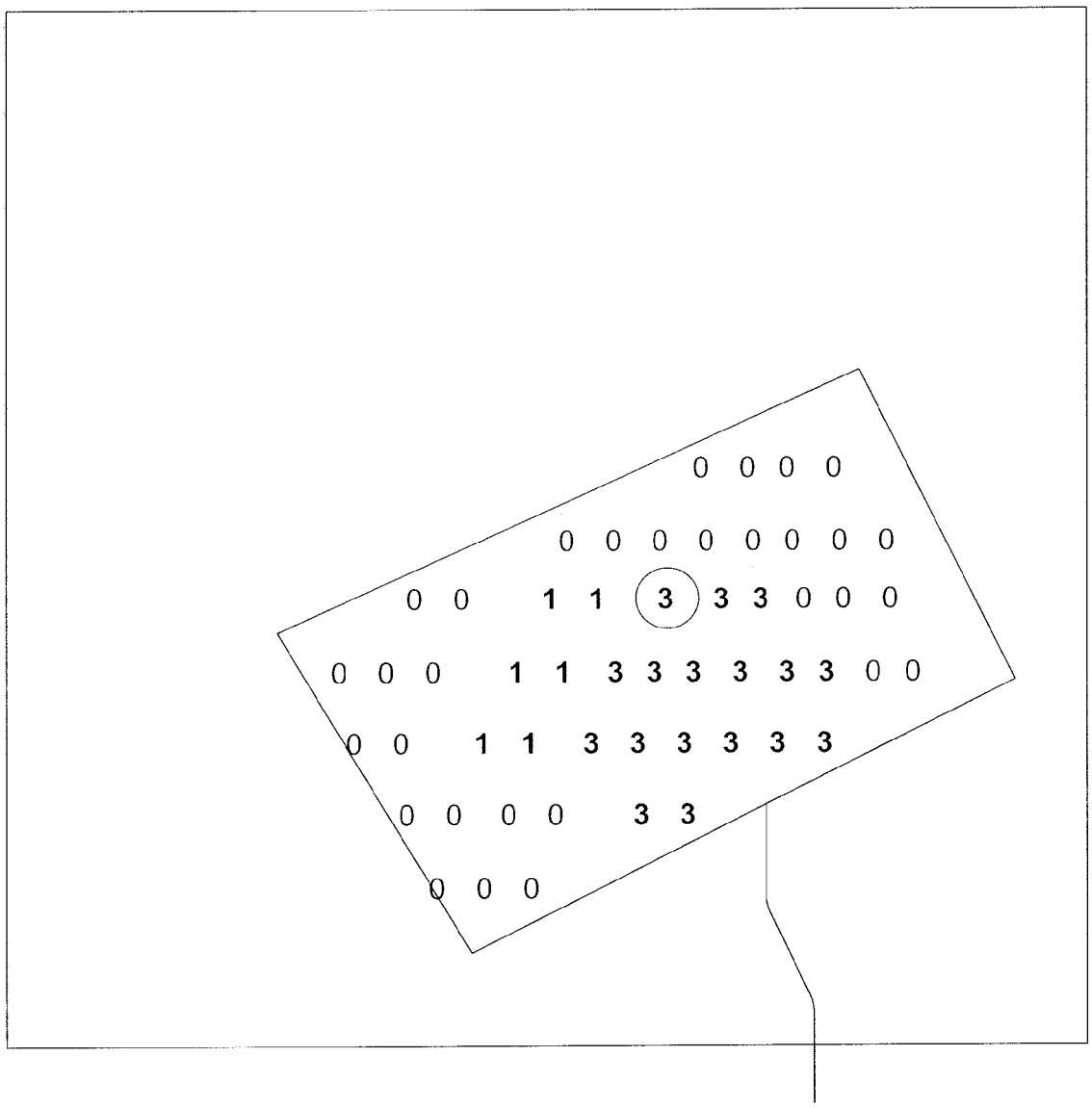
FIG. 20 is an exemplary diagram showing summed shade/time frequency file 2001 generated from file sets 1701, 1702, and 1703, representing the denominator of equation 1130.

FIG. 20 is an exemplary diagram showing summed shade/time frequency file 2001 (an example of file 1207) generated from file sets 1701, 1702, and 1703, representing the denominator of equation 1130. FIG. 20 represents the denominator of equation 1130. In step 1131, each cell in file 1206 (of which file 1801 in FIG. 18 is an example) is divided by the corresponding values in file 1207.

In the present example, the frequency of repetition of corresponding hillshade small interval time point data within the selected upper interval is either once in a month, or three times a month, as indicated by the "1"s and "3"s in FIG. 20, which correspond to the sum of the number of non-zero-value cells in all of the hillshade files 1203.

Figure 21:
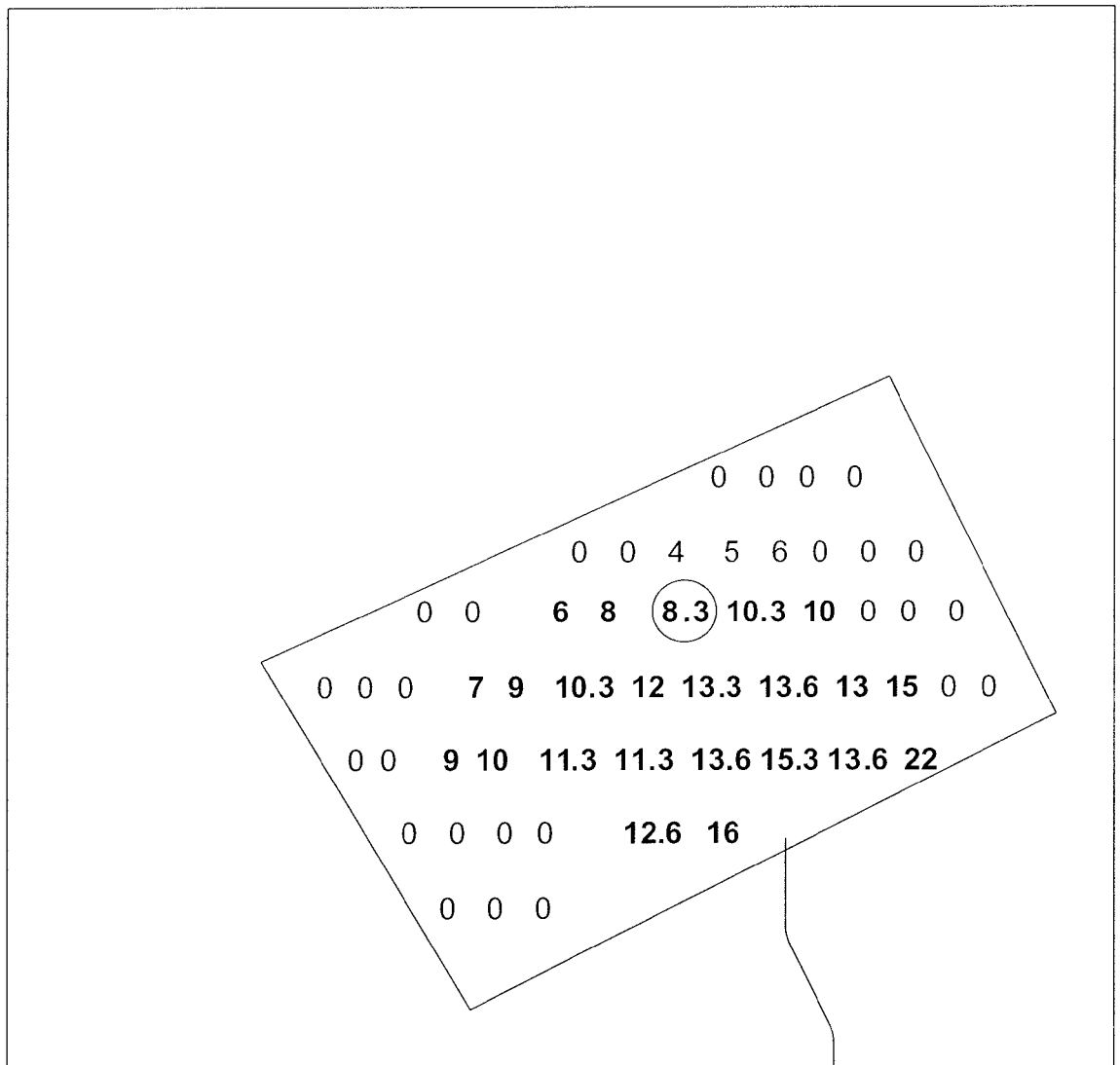
FIG. 21 is an exemplary diagram showing resultant data 2101 after division operation 1131 has been performed.

FIG. 21 is an exemplary diagram showing resultant data 2101 after division operation 1131 has been performed to generate corresponding file 1135, as described above. In the present example, each of the cells in file 1206 has been divided by the (value of the) corresponding cell in file 2001/1207, which represents the frequency of repetition (overlap) of small interval files 1203 for the selected upper time interval. The circled cell in file 1801 (in FIG. 18) having a value of 25 is thus divided by a value of 3, (as shown in FIG. 20) to determine the monthly average for the cell, which is 8.3, as indicated in file 2101 in FIG. 21.

Certain changes may be made in the above methods and systems without departing from the scope of that which is described herein. It should be noted that the present method is not limited to the extraction of data on rooftops. All matter contained in the above description and shown in the accompanying drawings is to be interpreted as illustrative and not in a limiting sense. For example, the methods shown in the accompanying drawings may include steps other than those shown therein, and the systems shown in the drawings may include different components than those shown therein. The elements and steps shown in the present drawings may be modified in accordance with the methods described herein, and the steps shown therein may be sequenced in other configurations without departing from the spirit of the system thus described. The following claims are intended to cover all generic and specific features described herein, as well as all statements of the scope of the present method, system and structure, which, as a matter of language, might be said to fall there between.

What is claimed is:

1. A method for generating temporal solar irradiance values comprising:

generating binary format hillshade files, for selected azimuth and altitude points on the Sun's path for selected times, wherein each of the hillshade files comprises a matrix of data cells representing shaded relief patterns for a selected area;

reclassifying data in the hillshade files into reclassified files, on basis of the selected time points relative to the solar radiation data, wherein each of the hillshade files includes data for one of a selected number of different time points for a selected number of intermediate time intervals in a selected upper time interval;

summing the reclassified files to generate a set of normalized reclassified files;

summing the values for each corresponding one of the cells in the set of normalized reclassified files to generate an irradiance-weighted shade file;

summing the hillshade files, by inclusively OR-ing corresponding values for each of the cells in each of the hillshade files to generate respective composite files for each of the selected intermediate time intervals;

summing the composite files to generate a summed shade/time frequency file in which each data point therein represents the frequency of repetition of corresponding cells in the hillshade files over the selected upper time interval; and dividing each data point value in the irradiance-weighted shade file by the corresponding data point value in the frequency file to generate a file comprising solar access values for the upper time interval, relative to the intermediate time interval, for the selected area.

2. The method of claim 1, wherein each of the cells in each of the hillshade files contains a binary number representing either a shadow or a non-shadow condition of a specific X/Y coordinate within the selected area for a specific time.

3. The method of claim 1, wherein each of the hillshade files includes data for the same time points for different ones of the intermediate intervals in the upper interval.

4. A method for generating temporal solar irradiance values comprising:

generating binary format hillshade files, for selected azimuth and altitude points on the Sun's path for selected time points, wherein each of the hillshade files comprises a matrix of data cells representing shaded relief patterns for a selected area;

reclassifying data in the hillshade files into reclassified files, on a basis of the selected time points relative to insolation of the selected area;

summing the reclassified files to generate a set of normalized reclassified files each representing a selected intermediate interval of time;

summing the values for each corresponding one of the cells in the set of normalized reclassified files to generate an irradiance-weighted shade file;

summing the hillshade files, by inclusively OR-ing corresponding values for each of the cells in each of the hillshade files to generate respective composite files for each said selected intermediate interval;

summing the composite files to generate a summed shade/time frequency file in which each data point therein represents the frequency of repetition of corresponding cells in the hillshade files over a selected upper interval of time; and dividing each data point value in the irradiance-weighted shade file by the corresponding data point value in the frequency file to generate a file comprising the temporal solar irradiance values for the upper interval, relative to the intermediate interval, for the selected area.

5. The method of claim 4, wherein each of the cells in each of the hillshade files contains a binary number representing either a shadow or a non-shadow condition of a specific X/Y coordinate within the selected area for a specific time.

6. The method of claim 4, wherein each of the hillshade files includes data for the same time points for different ones of the intermediate intervals in the upper interval.

7. The method of claim 4, wherein each of the hillshade files includes data for one of a selected number of different time points for a selected number of intermediate intervals in a selected upper interval.

8. A method for generating temporal solar irradiance values for a selected area comprising:

generating a plurality of hillshade files, using X/Y/Z digital elevation model data, for a plurality of points representing the Sun's azimuth and altitude relative to the selected area, using values for astronomical positions of the sun relative to the latitude and longitude for each of the points, wherein each of the hillshade files comprises a matrix of cells containing binary numbers, each representing either a shadow or a non-shadow condition of a specific X/Y coordinate within the selected area for a specific time;

reclassifying each of the hillshade files, based on irradiance levels, to generate reclassified hillshade files, wherein each of the cells therein represents the percentage of total solar radiation during a respective lower time interval for the selected area;

generating a set of normalized reclassified files by summing groups of the reclassified hillshade files, wherein each file in the set represents the sum of all of the associated normalized files within at least one selected intermediate interval of time;

summing the values for each corresponding one of the cells in the set of normalized reclassified files, within a selected upper interval of time represented by the set of normalized reclassified files, to generate an irradiance-weighted shade file for the upper interval;

summing each of the hillshade files, by inclusively OR-ing corresponding values for each of the cells in each of the hillshade files to generate a set of composite files for the selected intermediate intervals;

summing set of composite files to generate a single composite hillshade frequency file in which each data point therein represents the frequency of repetition, of corresponding said cells in the hillshade files for the lower interval, over the upper interval; and dividing the irradiance-weighted shade file by the summed shade/time frequency file, using a matrix division operation, to provide a file indicating the average percent of solar access per said cell for the upper interval, relative to the intermediate interval.

9. The method of claim 8, wherein each of the hillshade files includes data for the same time points for different ones of the intermediate intervals in the upper interval.

10. The method of claim 8, wherein each of the hillshade files includes data for one of a selected number of different time points for a selected number of intermediate intervals in a selected upper interval.

11. A method for predicting the total output of a solar energy system over a selected interval of time comprising:

generating binary format hillshade files, for selected azimuth and altitude points on the Sun's path, for selected times within the interval, wherein each of the hillshade files comprises a matrix of data cells representing shaded relief patterns for an area covered by the solar energy system;

reclassifying data in the hillshade files into reclassified files, on basis of selected time points relative to the solar radiation data;

summing the reclassified files to generate a set of normalized reclassified files; and calculating time-dependent irradiance values for the area covered by the solar energy system by summing the values for each corresponding one of the cells in the set of normalized reclassified files to generate an irradiance-weighted shade file indicating the total output of the solar energy system over the selected interval of time.

12. The method of claim 11, wherein each of the cells in each of the hillshade files contains a binary number representing either a shadow or a non-shadow condition of a specific X/Y coordinate within the selected area for a specific time.

13. The method of claim 11, wherein the output of the solar energy system is used to generate a data profile for a location of interest.

14. The method of claim 13, wherein the area covered by the solar energy system is a user-defined polygon.

15. A method for determining a solar energy profile for a selected area over a selected interval of time comprising:
  generating binary format hillshade files, for selected azimuth and altitude points on the Sun's path, for selected times within the interval, wherein each of the hillshade files comprises a matrix of data cells representing shaded relief patterns for the selected area;
  reclassifying data in the hillshade files into reclassified files, on basis of selected time points relative to the solar radiation data;
  summing the reclassified files to generate a set of normalized reclassified files; and
  calculating time-dependent irradiance values for the area covered by the solar energy system by summing the values for each corresponding one of the cells in the set of normalized reclassified files to generate an irradiance-weighted shade file indicating the solar energy profile for the selected area over the selected interval of time.

16. The method of claim 15, wherein the selected area is a portion of a single roof on a building structure.

17. A method for generating a solar energy profile over a selected time interval for a selected area comprising:
  generating hillshade files from a digital elevation model for the selected area, for selected azimuth and altitude points on the Sun's path, for selected times within the interval, wherein each of the hillshade files comprises a matrix of data cells representing shaded relief patterns with cell-specific values;
  applying cell-specific values, which represent the percentage insolation of the selected time interval for the selected area, to each of the hillshade files; and
  agglomerating the values for each corresponding (x, y) cell in a set of the hillshade files to generate a value-weighted grid indicating the solar energy profile for the selected area, over the selected time interval on a cell-by-cell basis.

18. The method of claim 17, wherein each said matrix of data cells represents shaded relief patterns as cell-specific total irradiance values.

19. The method of claim 17, wherein the unobstructed portions are determined by subtracting obstruction shadows, determined from the hillshade files, from the selected area.

20. The method of claim 17, wherein the selected area is a portion of a single roof on a building structure.

21. The method of claim 17, wherein the selected area is a user-defined polygon.

22. The method of claim 17, wherein the selected area is determined by a user of the method.

* * * * *